(12) United States Patent
Casper et al.

(10) Patent No.: US 8,055,807 B2
(45) Date of Patent: Nov. 8, 2011

(54) TRANSPORT CONTROL CHANNEL PROGRAM CHAIN LINKING INCLUDING DETERMINING SEQUENCE ORDER

(75) Inventors: Daniel F. Casper, Poughkeepsie, NY (US); John R. Flanagan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/183,323

(22) Filed: Jul. 31, 2008

(65) Prior Publication Data

US 2010/0030920 A1 Feb. 4, 2010

(51) Int. Cl.
G06F 3/00 (2006.01)
G06F 13/28 (2006.01)
G06F 9/00 (2006.01)

(52) U.S. Cl. .................. 710/5; 710/6; 710/24; 710/58; 712/225; 712/245

(58) Field of Classification Search .................. 710/1, 5, 710/6, 20, 22, 24, 33–35, 36, 58, 59, 61; 712/214, 220, 225, 226, 245
See application file for complete search history.

(56) References Cited

U.S. PATENT DOCUMENTS

| | | | |
|---|---|---|---|
| 3,943,283 A | 3/1976 | Caragliano et al. |
| 4,004,277 A | 1/1977 | Gavril |
| 4,374,415 A | 2/1983 | Cormier et al. |
| 4,380,046 A | 4/1983 | Frosch et al. |
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |

(Continued)

FOREIGN PATENT DOCUMENTS

DE 3931514 3/1990

(Continued)

OTHER PUBLICATIONS

Brice, et al.; U.S. Appl. No. 11/464,613; "Flexibility Controlling the Transfer of Data Between Input/Output Devices and Memory", filed Aug. 15, 2006; Specification having 23 pages and Drawings having 4 sheets.

(Continued)

*Primary Examiner* — Alford Kindred
*Assistant Examiner* — Richard B Franklin
(74) *Attorney, Agent, or Firm* — Cantor Colburn LLP; Steven Chiu

(57) ABSTRACT

A method, apparatus, and computer program product for processing a chain linked transport control channel program in an I/O processing system is provided. The method includes receiving a first command message at a control unit specifying a first predetermined sequence number for performing a first set of one or more commands as part of an I/O operation. The method further includes receiving a second command message specifying a second predetermined sequence number for performing a second set of one or more commands as part of the I/O operation. The method also includes comparing the sequence numbers to a next expected predetermined sequence number to determine an order of performing the commands. The method additionally includes executing the commands in the determined order to perform the I/O operation.

23 Claims, 11 Drawing Sheets

U.S. PATENT DOCUMENTS

| | | | |
|---|---|---|---|
| 5,040,108 A | 8/1991 | Kanazawa | |
| 5,386,512 A | 1/1995 | Crisman et al. | |
| 5,388,219 A | 2/1995 | Chan et al. | |
| 5,410,727 A | 4/1995 | Jaffe et al. | |
| 5,434,980 A | 7/1995 | Casper et al. | |
| 5,440,729 A | 8/1995 | Kimura et al. | |
| 5,461,721 A | 10/1995 | Cormier et al. | |
| 5,465,359 A | 11/1995 | Allen et al. | |
| 5,500,942 A | 3/1996 | Eickemeyer et al. | |
| 5,526,484 A | 6/1996 | Casper et al. | |
| 5,539,918 A | 7/1996 | Allen et al. | |
| 5,546,533 A | 8/1996 | Koyama | |
| 5,584,039 A | 12/1996 | Johnson et al. | |
| 5,600,793 A | 2/1997 | Nord | |
| 5,613,163 A | 3/1997 | Marron et al. | |
| 5,640,600 A | 6/1997 | Satoh et al. | |
| 5,758,190 A | 5/1998 | Johnson et al. | |
| 5,768,620 A | 6/1998 | Johnson et al. | |
| 5,831,985 A | 11/1998 | Sandorfi | |
| 5,860,022 A | 1/1999 | Kondou et al. | |
| 5,894,583 A | 4/1999 | Johnson et al. | |
| 5,901,327 A | 5/1999 | Ofek | |
| 5,918,028 A | 6/1999 | Silverthorn et al. | |
| 6,230,218 B1 | 5/2001 | Casper et al. | |
| 6,343,335 B1 | 1/2002 | Dahman et al. | |
| 6,353,612 B1 | 3/2002 | Zhu et al. | |
| 6,484,217 B1 | 11/2002 | Fuente et al. | |
| 6,546,435 B1 | 4/2003 | Yoshimura et al. | |
| 6,584,511 B1 | 6/2003 | Marsh, III et al. | |
| 6,609,161 B1 | 8/2003 | Young | |
| 6,647,016 B1 | 11/2003 | Isoda et al. | |
| 6,651,125 B2 | 11/2003 | Maergner et al. | |
| 6,658,603 B1 | 12/2003 | Ward | |
| 6,693,880 B2 | 2/2004 | Gregg et al. | |
| 6,694,390 B1 | 2/2004 | Bogin et al. | |
| 6,751,680 B2 | 6/2004 | Langerman et al. | |
| 6,772,207 B1 | 8/2004 | Dorn et al. | |
| 6,826,661 B2 | 11/2004 | Umbehocker et al. | |
| 6,839,773 B2 | 1/2005 | Vishlitzky et al. | |
| 6,862,322 B1 | 3/2005 | Ewen et al. | |
| 6,898,202 B2 | 5/2005 | Gallagher et al. | |
| 6,915,378 B2 | 7/2005 | Roberti | |
| 7,000,036 B2 | 2/2006 | Carlson et al. | |
| 7,003,700 B2 | 2/2006 | Elko et al. | |
| 7,020,810 B2 | 3/2006 | Holman | |
| 7,035,540 B2 | 4/2006 | Finan et al. | |
| 7,058,735 B2 | 6/2006 | Spencer | |
| 7,100,096 B2 | 8/2006 | Webb, Jr. et al. | |
| 7,111,130 B2 | 9/2006 | Blake et al. | |
| 7,120,728 B2 | 10/2006 | Krakirian et al. | |
| 7,124,207 B1 | 10/2006 | Lee et al. | |
| 7,133,988 B2 | 11/2006 | Fujibayashi | |
| 7,149,823 B2 | 12/2006 | Miller et al. | |
| 7,164,425 B2 | 1/2007 | Kwak et al. | |
| 7,202,801 B2 | 4/2007 | Chou | |
| 7,277,387 B2 | 10/2007 | Sanders et al. | |
| 7,315,911 B2 | 1/2008 | Davies et al. | |
| 7,382,733 B2 * | 6/2008 | Banerjee et al. | 370/236 |
| 7,395,284 B2 | 7/2008 | Sato et al. | |
| 7,398,335 B2 | 7/2008 | Sonksen et al. | |
| 7,484,021 B2 | 1/2009 | Rastogi et al. | |
| 7,500,030 B2 | 3/2009 | Hathorn et al. | |
| 7,539,777 B1 | 5/2009 | Aitken | |
| 7,543,087 B2 * | 6/2009 | Philbrick et al. | |
| 7,555,554 B2 | 6/2009 | Manders et al. | |
| 7,558,827 B2 | 7/2009 | Kawashima et al. | |
| 7,564,791 B2 | 7/2009 | Jayakrishnan et al. | |
| 7,577,772 B2 * | 8/2009 | Sonksen et al. | |
| 7,577,773 B1 * | 8/2009 | Gandhi et al. | |
| 7,594,057 B1 * | 9/2009 | Gandhi et al. | |
| 7,599,360 B2 | 10/2009 | Edsall et al. | |
| 7,711,871 B1 | 5/2010 | Haechten et al. | |
| 7,743,197 B2 * | 6/2010 | Chavan et al. | |
| 7,765,336 B2 * | 7/2010 | Butler et al. | |
| 7,826,349 B2 * | 11/2010 | Kaur et al. | |
| 7,840,717 B2 * | 11/2010 | Flanagan et al. | 710/5 |
| 7,840,718 B2 * | 11/2010 | Ricci et al. | 710/5 |
| 7,856,511 B2 * | 12/2010 | Ricci et al. | 710/5 |
| 2001/0030943 A1 | 10/2001 | Gregg et al. | |
| 2002/0062407 A1 | 5/2002 | Tateyama et al. | |
| 2002/0099967 A1 | 7/2002 | Kawaguchi | |
| 2002/0152338 A1 * | 10/2002 | Elliott et al. | 710/34 |
| 2002/0178404 A1 | 11/2002 | Austen et al. | |
| 2003/0056000 A1 * | 3/2003 | Mullendore et al. | |
| 2003/0084213 A1 | 5/2003 | Brice, Jr. et al. | |
| 2003/0158998 A1 | 8/2003 | Smith | |
| 2003/0188053 A1 | 10/2003 | Tsai | |
| 2004/0030822 A1 | 2/2004 | Rajan et al. | |
| 2004/0054776 A1 | 3/2004 | Klotz et al. | |
| 2004/0113772 A1 | 6/2004 | Hong Chou | |
| 2004/0136241 A1 | 7/2004 | Rapp et al. | |
| 2004/0151160 A1 | 8/2004 | Sanders et al. | |
| 2004/0193968 A1 | 9/2004 | Dugan et al. | |
| 2004/0210719 A1 | 10/2004 | Bushey et al. | |
| 2004/0260851 A1 | 12/2004 | Tu | |
| 2005/0018673 A1 | 1/2005 | Dropps et al. | |
| 2005/0102456 A1 | 5/2005 | Kang | |
| 2005/0105456 A1 | 5/2005 | Cookson et al. | |
| 2005/0108251 A1 | 5/2005 | Hunt | |
| 2005/0175341 A1 | 8/2005 | Ovadia | |
| 2005/0204069 A1 | 9/2005 | Carlson et al. | |
| 2005/0223291 A1 | 10/2005 | Zimmer et al. | |
| 2005/0257118 A1 | 11/2005 | Shien | |
| 2006/0036769 A1 | 2/2006 | Frey et al. | |
| 2006/0050726 A1 | 3/2006 | Ahmed et al. | |
| 2006/0085595 A1 | 4/2006 | Slater | |
| 2006/0159112 A1 | 7/2006 | Sundaram et al. | |
| 2006/0224795 A1 | 10/2006 | Muto et al. | |
| 2007/0005838 A1 * | 1/2007 | Chang et al. | |
| 2007/0016554 A1 | 1/2007 | Dapp et al. | |
| 2007/0061463 A1 | 3/2007 | Hiramatsu et al. | |
| 2007/0072543 A1 | 3/2007 | Paila et al. | |
| 2007/0079051 A1 | 4/2007 | Tanaka et al. | |
| 2007/0091497 A1 | 4/2007 | Mizuno et al. | |
| 2007/0162631 A1 | 7/2007 | Balakrishnan et al. | |
| 2007/0174544 A1 | 7/2007 | Yasuda et al. | |
| 2007/0239944 A1 | 10/2007 | Rupanagunta et al. | |
| 2007/0294697 A1 | 12/2007 | Theimer et al. | |
| 2008/0040519 A1 | 2/2008 | Starr et al. | |
| 2008/0147890 A1 | 6/2008 | Casper et al. | |
| 2008/0183877 A1 | 7/2008 | Carlson et al. | |
| 2008/0235553 A1 | 9/2008 | Chintada | |
| 2008/0256264 A1 | 10/2008 | Muto et al. | |
| 2008/0273518 A1 | 11/2008 | Pratt | |
| 2008/0307122 A1 | 12/2008 | Butler et al. | |
| 2009/0055585 A1 | 2/2009 | Fernandes et al. | |
| 2009/0144586 A1 | 6/2009 | Casper et al. | |
| 2009/0172203 A1 | 7/2009 | Casper et al. | |
| 2009/0210557 A1 | 8/2009 | Gainey, Jr. et al. | |
| 2009/0210559 A1 | 8/2009 | Flanagan et al. | |
| 2009/0210560 A1 | 8/2009 | Yudenfriend et al. | |
| 2009/0210561 A1 | 8/2009 | Ricci et al. | |
| 2009/0210562 A1 | 8/2009 | Huang et al. | |
| 2009/0210563 A1 | 8/2009 | Flanagan et al. | |
| 2009/0210564 A1 | 8/2009 | Ricci et al. | |
| 2009/0210570 A1 | 8/2009 | Bendyk et al. | |
| 2009/0210571 A1 | 8/2009 | Casper et al. | |
| 2009/0210572 A1 | 8/2009 | Yudenfriend et al. | |
| 2009/0210573 A1 | 8/2009 | Yudenfriend et al. | |
| 2009/0210576 A1 | 8/2009 | Casper et al. | |
| 2009/0210579 A1 | 8/2009 | Bendyk et al. | |
| 2009/0210580 A1 | 8/2009 | Bendyk et al. | |
| 2009/0210581 A1 | 8/2009 | Flanagan et al. | |
| 2009/0210582 A1 | 8/2009 | Bendyk et al. | |
| 2009/0210583 A1 | 8/2009 | Bendyk et al. | |
| 2009/0210584 A1 | 8/2009 | Carlson et al. | |
| 2009/0210585 A1 | 8/2009 | Ricci et al. | |
| 2009/0210768 A1 | 8/2009 | Carlson et al. | |
| 2009/0210769 A1 | 8/2009 | Casper et al. | |
| 2009/0210884 A1 | 8/2009 | Ricci et al. | |
| 2009/0307388 A1 | 12/2009 | Tchapda | |
| 2010/0014526 A1 | 1/2010 | Chavan et al. | |
| 2010/0064072 A1 | 3/2010 | Tang et al. | |

FOREIGN PATENT DOCUMENTS

| | | |
|---|---|---|
| GB | 1264096 | 2/1972 |
| GB | 2291990 | 2/1996 |

| JP | 63236152 | 10/1988 |
| JP | 2010-140127 A | 6/2010 |
| WO | WO2006102664 A2 | 9/2006 |

OTHER PUBLICATIONS

Casper, et al.; U.S. Appl. No. 11/548,060; "Facilitating Input/Output Processing by Using Transport Control Words to Reduce Input/Output Communications"filed Oct. 16, 2006; Specification having 32 pages and Drawings having 12 sheets.

Casper, et al.; U.S. Appl. No. 11/548,093; "Facilitating Access to Status and Measurement Data Associated With Input/Output Processing", filed Oct. 16, 2006; Specification having 33 pages and Drawings having 12 sheets.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing on Serial I/O Channels"; IBM Technical Disclosure Bulletin; vol. 32; No. 10A; Mar. 1990; pp. 39-40.

Golasky, Richard; "Link-Level Error Recovery With Tape Backup"; Dell Power Solutions; Aug. 2005; pp. 88-91.

"IBM® z/Architecture Principles of Operation", Publication No. SA22-7832-05, 6th Edition, Apr. 2007. 1,215 pages separated into 4 electronic attachments.

Peterson, David; "Information Techonology, Fibre Channel Protocol for SCSI, Fourth Version (FCP-3)", Draft Proposed American National Standard, Jun. 2004; pp. 1-142.

Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.

Snively, et al.; "Fibre Channel, Framing and Signaling"; (FC-FS) Rev. 1.70; NCITS Working Draft Proposed American National Standard for Information Technology; Feb. 2002; pp. i-575.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.

Iren, et al.; "The Transport Layer: Tutorial and Survey"; ACM Computing Surveys; vol. 31, No. 4; Dec. 1999; pp. 360-405.

International Search Report and Written Opinion for PCT/EP2009/051447 dated Jul. 1, 2009.

International Search Report and Written Opinion for PCT/EP2009/051483 dated Jul. 27, 2009.

Nordstrom.; "Sequence Reception Method for a Fibre Channel Protocol Chip"; IBM Technical Disclosure Bulletin; vol. 38, No. 12; Dec. 1995; pp. 267-269.

U.S. Appl. No. 11/548,060 Non-Final Office Action dated Apr. 15, 2008.

U.S. Appl. No. 11/548,093 Non-Final Office Action dated Apr. 17, 2008.

"Protocol for Insochronous Traffc Over Fiber Channel Switching"; IBM Technical Disclosure Bulletin; vol. 37, No. 06B; Jun. 1994. pp. 377-380.

Sachs, M.W.; "I/O Marker Changing"; IBM Technical Disclosure Bulletin; vol. 37, No. 02A; Feb. 1994; pp. 75-76.

Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.

Srikrishnan et al.; "Sharing FCP Adapters Through Virtualization"; IBM J. Res. & Dev., vol. 51, No. 1/2; Jan./Mar. 2007; pp. 103-118.

Stone, et al.; "When the CRC and TCP Checksum Disagree"; SIGCOMM '00, Stockholm, Sweden; Jul. 2000; 10 pages.

"z/Architecture-Principles of Operation," IBM Publication No. SA22-7832-04, 5th Ed., Sep. 2005.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,954 Non-Final Office Action dated Jan. 21, 2010.

Written Opinion and International Search Report for PCT/EP2009/051461 dated Sep. 22, 2009.

U.S. Appl. No. 12/031,182 Non-Final Office Action dated Jan. 22, 2010.

U.S. Appl. No. 12/031,201 Non-Final Office Action dated Jan. 25, 2010.

International Search Report; International Application No. PCT/EP2009/059184; International Filing Date: Jul. 16, 2009; Date of mailing: Jan. 14, 2010; 9 pages.

Written Opinion and International Search Report for PCT/EP2009/051445 dated Jun. 25, 2009.

Written Opinion and International Search Report for PCT/EP2009/051446 dated Jun. 25, 2009.

Written Opinion and International Search Report for PCT/EP2009/051462 dated Jul. 1, 2009.

Written Opinion and International Search Report for PCT/EP2009/051450 dated Jul. 7, 2009.

Written Opinion and International Search Report for PCT/EP2009/051459 dated Jun. 23, 2009.

Written Opinion and International Search Report for PCT/EP2009/051463 dated Jul. 22, 2009.

U.S. Appl. No. 12/030,967 Restriction Requirement Mailed Dec. 29, 2009.

ANSI INCITS 433-2007, Information Technology Fibre Channel Link Services (FC-LS), Jul. 2007.

Fibre Channel Single Byte Command Code Sets-2 Mapping Protocol (FC-SB-3), T11/Project 1357-D/Rev 1.6, INCITS Mar. 2003.

U.S. Appl. No. 12/030,951 Non-Final Office Action dated May 20, 2010.

U.S. Appl. No. 12/031,038, Non-Final Office Action Mailed Apr. 15, 2010.

U.S. Appl. No. 12/030,975. Final Office Action Mailed May 13, 2010.

U.S. Appl. No. 12/030,967, Notice of Allowance mailed Apr. 23, 2010.

U.S. Appl. No. 12/030,985, Non Final Office Action Mailed May 5, 2010.

U.S. Appl. No. 12/031,042, Non-Final Office Action Mailed Apr. 5, 2010.

U.S. Appl. No. 12/031,021, Notice of Allowance Mailed Apr. 30, 2010.

U.S. Appl. No. 12/183,305, Non-Final Office Action Mailed May 11, 2010.

U.S. Appl. No. 12/183,315 Notice of Allowance dated Jun. 15, 2010.

U.S. Appl. No. 12/030,989 Final Office Action dated May 24, 2010.

SCSI Primary Commands—4 (SPC-4); Project T10/1731-D. Rev 11. INCITS Apr. 14, 2010.

U.S. Appl. No. 12/030,939 Notice of Alllowance mailed Jun. 29, 2010.

U.S. Appl. No. 12/030,954 Non Final Office Action mailed Jul. 12, 2010.

U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
Aboda, B.-et al.; Network Working Group; "Securing Block Storage Protocols Over Ip"; Acm Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
Behrs, Jr, "Adaptive Prediction Minimizes Data Overrun and Underrun", IBM, Nov. 1994, pp. 1-3. http://priorartdatabase.com/IPCOM/000114189.
U.S. Appl. No. 12/031,038, Notice of Allowance Mailed Oct. 6, 2010.

Final Office Action for U.S. Appl. No. 12/030,912 mailed Oct. 6, 2010.
U.S. Appl. No. 12/030,920 Notice of Allowance Mailed Aug. 23, 2010.
U.S. Appl. No. 12/030,932, Final Office Action Mailed Jul. 23, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Final Office Action Mailed Aug. 3, 2010.
U.S. Appl. No. 12/031,042, Final Office Action Mailed Oct. 25, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
IBM, "Method and Apparatus to Monitor PAV Utilization", Feb. 2005, pp. 1-3. http://priorartdatabase.com/IPCOM/000082878.
Moore et al., Reconfiguration of Storage Elements to Improve Performance, IBM, Dec. 1983, pp. 1-3. http://priorartdatabas.com/IPCOM/000047719.
U.S. Appl. No. 12/030,975, Notice of Allowance Mailed Oct. 19, 2010.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/183,315, Notice of Allowance Mailed Dec. 13, 2010.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.

* cited by examiner

| WORD | 0 | 1 | 2 | 3 |
|---|---|---|---|---|
| 0 | F RESERVED 808 | TCCBL (L1) | RW | RESERVED 814 |
| 1 | RESERVED | | FLAGS | |
| 2 | OUTPUT-DATA ADDRESS 816 | | | |
| 3 | | | | |
| 4 | INPUT-DATA ADDRESS 818 | | | |
| 5 | | | | |
| 6 | TRANSPORT-STATUS-BLOCK ADDRESS 820 | | | |
| 7 | | | | |
| 8 | TRANSPORT-COMMAND-CONTROL BLOCK ADDRESS 822 | | | |
| 9 | | | | |
| 10 | OUTPUT COUNT 824 | | | |
| 11 | INPUT COUNT 826 | | | |
| 12 | NEXT TCW ADDRESS 828 | | | |
| 13 | | | | |
| 14 | INTERROGATE ADDRESS 830 | | | |
| 15 | | | | |

FIG. 8

| DEFINITION | WORD | BYTE 0 | 1 | 2 | 3 |
|---|---|---|---|---|---|
| TRANSPORT COMMAND IU | HEADER 902 | 0 | | | |
| | | 1 | ADDRESS HEADER 912 | | |
| | TCH 904 | 2 | TC_IU SEQUENCE NUMBER 913 | TASK 914 | L1 LENGTH 916 / R/W 918 |
| | TRANSPORT-COMMAND-AREA HEADER (TCAH) 906 | 3 | FORMAT 920 | CONTROL 922 | RESERVED 924 |
| | | 4 | 926 | RESERVED | TCCB-FLAGS 927 | L2 LENGTH 928 |
| | | 5 | SERVICE ACTION CODE 930 | RESERVED 932 | PRIORITY 934 |
| | | 6 | RESERVED 936 | | |
| | TRANSPORT COMMAND AREA (TCA) 908 | DCW 1 & CONTROL DATA 940 | COMMAND 948 | FLAGS 950 | RESERVED 952 | CD COUNT 954 |
| | | | DATA BYTE COUNT 956 | | |
| | | | CONTROL DATA 958 | | |
| | | DCW 2 942 | COMMAND 960 | FLAGS 962 | RESERVED 964 | CD COUNT 966 |
| | | | DATA BYTE COUNT 968 | | |
| | | DCW 3 944 | COMMAND 970 | FLAGS 972 | RESERVED 974 | CD COUNT 976 |
| | | | DATA BYTE COUNT 978 | | |
| | | DCW 4 946 | COMMAND 980 | FLAGS 982 | RESERVED 984 | CD COUNT 986 |
| | | | DATA BYTE COUNT 988 | | |
| | TRANSPORT-COMMAND AREA TRAILER (TCAT) 910 | | LRC 990 | | |
| | | | TRANSPORT DATA BYTE COUNT 992 | | |
| | | | BIDIRECTIONAL READ DATA LENGTH 994 | | |

TRANSPORT CONTROL CHANNEL PROGRAM CHAIN LINKING INCLUDING DETERMINING SEQUENCE ORDER

BACKGROUND

1. Field of Invention

The present disclosure relates generally to input/output (I/O) processing, and in particular, to transport control channel program chain linking in an I/O processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the I/O command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command. Performing I/O processing on a per CCW basis may involve a large amount of processing overhead for the channel subsystem, as the channels parse CCWs, track state information, and react to responses from the control units.

SUMMARY

An exemplary embodiment includes a computer program product for processing a chain linked transport control channel program at a control unit configured for communication with an input/output (I/O) subsystem in an I/O processing system. The computer program product includes a tangible storage medium readable by a processing circuit and storing instructions for execution by the processing circuit for performing a method. The method includes receiving a first command message at the control unit from the I/O subsystem, the first command message specifying a first predetermined sequence number for performing a first set of one or more commands as part of an I/O operation. The method further includes receiving a second command message at the control unit from the I/O subsystem, the second command message specifying a second predetermined sequence number for performing a second set of one or more commands as part of the I/O operation. The method also includes comparing the sequence numbers of the command messages received to a next expected predetermined sequence number to determine an order of performing the first set of one or more commands received relative to the second set of one or more commands received as a first execution set and a second execution set without regard to the order received. The method additionally includes executing the first and second execution sets in the determined order to perform the I/O operation.

Another exemplary embodiment includes an apparatus for processing a chain linked transport control channel program at a control unit in an I/O processing system. The apparatus comprises a control unit configured for communication with an I/O subsystem of the I/O processing system. The control unit performs a method that includes receiving a first command message at the control unit from the I/O subsystem, the first command message specifying a first predetermined sequence number for performing a first set of one or more commands as part of an I/O operation. The control unit receives a second command message from the I/O subsystem, the second command message specifying a second predetermined sequence number for performing a second set of one or more commands as part of the I/O operation. The control unit compares the sequence numbers of the command messages received to a next expected predetermined sequence number to determine an order of performing the first set of one or more commands received relative to the second set of one or more commands received as a first execution set and a second execution set without regard to the order received. The control unit executes the first and second execution sets in the determined order to perform the I/O operation.

A further exemplary embodiment includes a method for processing a chain linked transport control channel program at a control unit configured for communication with an I/O subsystem in an I/O processing system. The method includes receiving a first command message at the control unit from the I/O subsystem, the first command message specifying a first predetermined sequence number for performing a first set of one or more commands as part of an I/O operation. The method further includes receiving a second command message at the control unit from the I/O subsystem, the second command message specifying a second predetermined sequence number for performing a second set of one or more commands as part of the I/O operation. The method also includes comparing the sequence numbers of the command messages received to a next expected predetermined sequence number to determine an order of performing the first set of one or more commands received relative to the second set of one or more commands received as a first execution set and a second execution set without regard to the order received. The method additionally includes executing the first and second execution sets in the determined order to perform the I/O operation.

An additional exemplary embodiment includes a computer program product for processing a chain linked transport control channel program at a channel subsystem configured for communication with a control unit in an I/O processing system. The computer program product includes a tangible storage medium readable by a processing circuit and storing instructions for execution by the processing circuit for performing a method. The method includes configuring a first command message specifying a first predetermined sequence number for performing a first set of one or more commands as part of an I/O operation, and configuring a second command message specifying a second predetermined sequence number for performing a second set of one or more commands as part of the I/O operation. The method further includes establishing a chain link between the first and second command messages, the predetermined sequence numbers providing an order of performing the first set of one or more commands relative to the second set of one or more commands without regard to the order received at the control unit. The method also includes transmitting the first and second command messages from the channel subsystem to the control unit.

A further exemplary embodiment includes an apparatus for processing a chain linked transport control channel program at a channel subsystem in an I/O processing system. The apparatus includes a channel subsystem configured for communication with a control unit of the I/O processing system. The channel subsystem performs a method that includes configuring a first command message specifying a first predetermined sequence number for performing a first set of one or more commands as part of an I/O operation, and configuring a second command message specifying a second predetermined sequence number for performing a second set of one or more commands as part of the I/O operation. The channel subsystem also establishes a chain link between the first and second command messages, the predetermined sequence numbers providing an order of performing the first set of one or more commands relative to the second set of one or more commands without regard to the order received at the control unit, and transmits the first and second command messages from the channel subsystem to the control unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8 depicts one embodiment of a TCW in accordance with an aspect of the present invention;

FIG. 9 depicts one embodiment of a command message communicated from a channel subsystem to a control unit, in accordance with an aspect of the present invention;

DETAILED DESCRIPTION OF THE INVENTION

Figure 1:
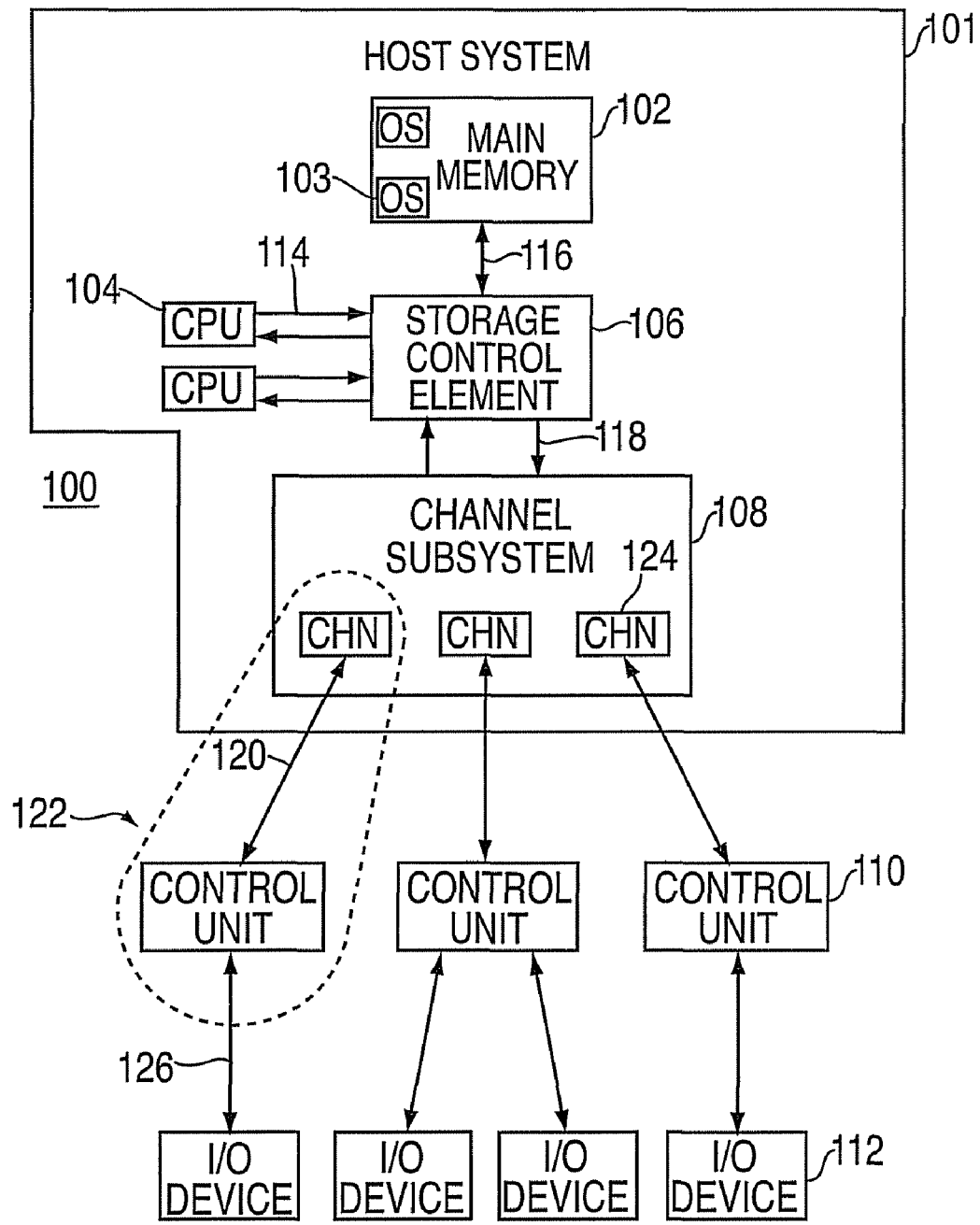
FIG. 1 depicts one embodiment of an I/O processing system incorporating and using one or more aspects of the present invention.

In accordance with an aspect of the present invention, input/output (I/O) is facilitated with chaining to link portions of a transport control channel program together and support program controlled interrupts between portions of the transport control channel program. A transport control channel program facilitates I/O processing by reducing communications between components of an I/O processing system used to perform the I/O processing. For instance, the number of exchanges and sequences between an I/O communications adapter, such as a channel, and a control unit is reduced. This is accomplished through sending multiple commands and/or data to the control unit grouped in blocks for execution at the control unit rather than sending individual channel command words (CCWs).

Channel programs implemented with CCWs (also referred to as "CCW channel programs") involve a large degree of handshaking to perform tasks. For example, writing a 4 kilobyte block of data using a CCW channel program typically requires an exchange to be opened, transmission of a define extent command with data, transmission of a locate record command with data, and transmission of a write command with data from the channel to the control unit. The control unit typically responds by opening an exchange and sending a response to acknowledge the write command, sending a status message upon completing the write command, and closing the exchange it opened. The channel may then respond by closing the exchange that it opened. Using a TCW channel program, a transport command control block (TCCB) can be sent from the channel to the control unit as a block of commands, avoiding many of the messages between the channel and the control unit that would otherwise be performed using a CCW channel program. For example, the TCW channel program can avoid opening an exchange to respond that the control unit received the write command. The cumulative effect over multiple command sequences can result in a large time savings when running a TCW channel program instead of a CCW channel program, and thus overall I/O processing system throughput is increased. In an exemplary embodiment, an I/O processing system can support CCW channel programs in command mode and TCW channel programs in transport mode. Transport mode indicates that the channel transports commands and data to the control unit without interpreting or distinguishing between the commands and data transported.

In an exemplary embodiment, the link protocol used for command mode communications is FICON (Fibre Connectivity). Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety. The link protocol used for transport mode communications may be, for instance, Fibre Channel Protocol (FCP). In particular, three phases of the FCP link protocol can be used, allowing use of host bus adapters that support FCP to perform data transfers. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety. It will be understood that other versions of these protocols and/or similar protocols can be used within the scope of the invention.

A plurality of commands (e.g., device command words or "DCWs") can be included in a TCCB, the contents of which are located via one or more address references (indirect or direct) in a transport control word (TCW). In an exemplary embodiment, the TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

A single TCCB may be constrained in size as a function of a link protocol or buffer size constraints, which can in turn limit the number of commands and/or amount of data associated with the TCCB. Some I/O operations can include a greater number of commands or volume of data than may be incorporated in a single TCCB. In an exemplary embodiment, chain linking of multiple TCWs with associated TCCBs is employed to create larger TCW channel programs, allowing a single I/O operation to span multiple TCWs and TCCBs. A program control interrupt (PCI) is also supported to send an intermediate notification of progress of a chain linked TCW channel program from the channel to the OS, enabling the OS to release or reuse resources that had previously been allocated for one or more commands of a TCCB prior to the PCI. The PCI serves as a compact status indicator without requiring a full extended status message after each TCCB. Chain linking of a TCW channel program with PCI support can enhance conversion of a lengthy CCW channel program into a chain linked TCW channel program that would otherwise include a larger number of commands than a single TCCB can hold. Furthermore, a chain linked TCW channel program may be more efficient than running a series of separate TCW channel programs in that an extended status message can be held off until completion of the full chain linked TCW channel program, rather than sending it for each separate TCW channel program. Moreover, overhead involved in configuring and managing communications may be further reduced when running a chain linked TCW channel program in contrast to a series of separate TCW channel programs, where each separate TCW channel program accomplishes a portion of an I/O operation.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 1 10. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric (e.g., a fibre channel network). Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2:
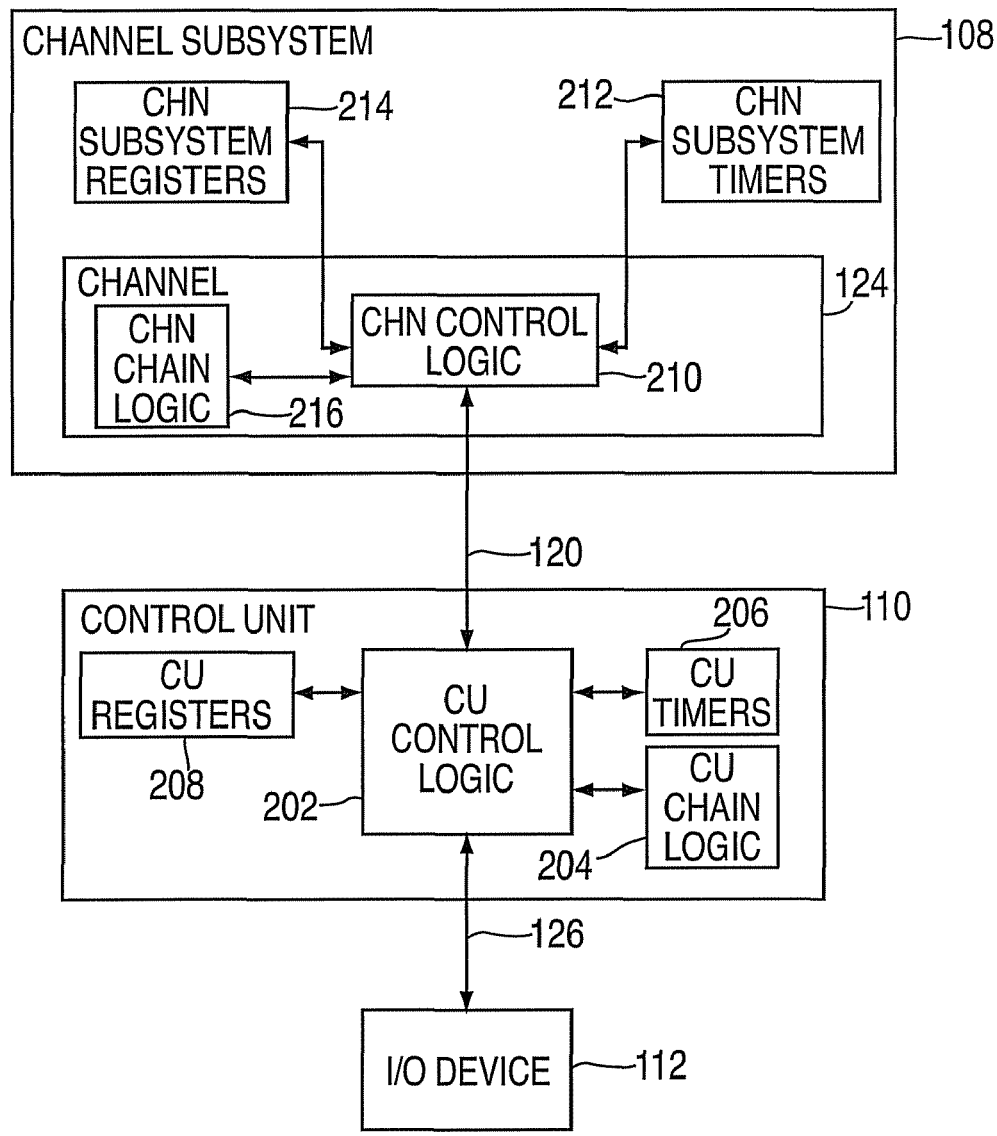
FIG. 2 depicts one embodiment of a control unit and a channel subsystem, in accordance with an aspect of the present invention.

Turning now to FIG. 2, one embodiment of the control unit 110 and the channel 124 of FIG. 1 that support chain linked TCW channel program execution is depicted in greater detail. The control unit 110 includes CU control logic 202 to parse and process command messages containing one or more TCCBs, received from the channel 124 via the connection 120. The CU control logic 202 can extract DCWs and control data from the TCCB(s) received at the control unit 110 to control a device, for instance, I/O device 112 via connection 126. The CU control logic 202 sends device commands and data to the I/O device 112, as well as receives status information and other feedback from the I/O device 112. The CU control logic 202 may use CU chain logic 204 to perform various checks of the command messages received at the control unit 110, as well as determine an appropriate response. For example, the CU chain logic 204 can inform the channel 124 of the maximum number of linked commands that are supported. The CU chain logic 204 may also handle padding, incorrect length suppression, and chain linking at the DCW level. While the CU chain logic 204 is depicted separately from the CU control logic 202, it will be understood that the CU chain logic 204 can be incorporated as part of the CU control logic 202.

The CU control logic 202 can access and control other elements within the control unit 110, such as CU timers 206 and CU registers 208. The CU timers 206 may include multiple timer functions to track how much time a sequence of I/O operations or a single I/O operation takes to complete. The CU timers 206 may further include one or more countdown timers to monitor and abort I/O operations and commands that do not complete within a predetermined period. In an exemplary embodiment, the CU timers 206 continue to run between chained TCCBs until the chain completes as an I/O operation spanning multiple TCCBs. The CU registers 208 can include fixed values that provide configuration and status information, as well as dynamic status information that is updated as commands are executed by the CU control logic 202. The control unit 110 may further include other buffer or memory elements (not depicted) to store multiple messages or status information associated with communications between the channel 124 and the I/O device 112. The CU registers 208 may include a maximum linked commands parameter that defines the maximum number of streamed command messages for one I/O operation that the control unit 110 supports.

The channel 124 in the channel subsystem 108 includes multiple elements to support communication with the control unit 110. For example, the channel 124 may include CHN control logic 210 that interfaces with CHN subsystem timers 212 and CHN subsystem registers 214. In an exemplary embodiment, the CHN control logic 210 controls communication between the channel subsystem 108 and the control unit 110. The CHN control logic 210 may directly interface to the CU control logic 202 via the connection 120 to send commands and receive responses, such as transport command information units (TC_IUs) and response IUs. Alternatively, messaging interfaces and/or buffers (not depicted) can be placed between the CHN control logic 210 and the CU control logic 202. The CHN subsystem timers 212 may include multiple timer functions to track how much time a sequence of I/O operations takes to complete, in addition to the time tracked by the control unit 110. The CHN subsystem timers 212 may further include one or more countdown timers to monitor and abort command sequences that do not complete within a predetermined period. The CHN subsystem registers 214 can include fixed values that provide configuration and status information, as well as dynamic status information, updated as commands are transported and responses are received.

In an exemplary embodiment, the channel subsystem 108 further includes CHN chain logic 216. The CHN chain logic 216 can manage chain linking and PCI generation for the channel 124. Although the CHN chain logic 216 is depicted separately from the CHN control logic 210, it will be understood that the CHN chain logic 216 can be incorporated as part of the CHN control logic 210.

Figure 3:
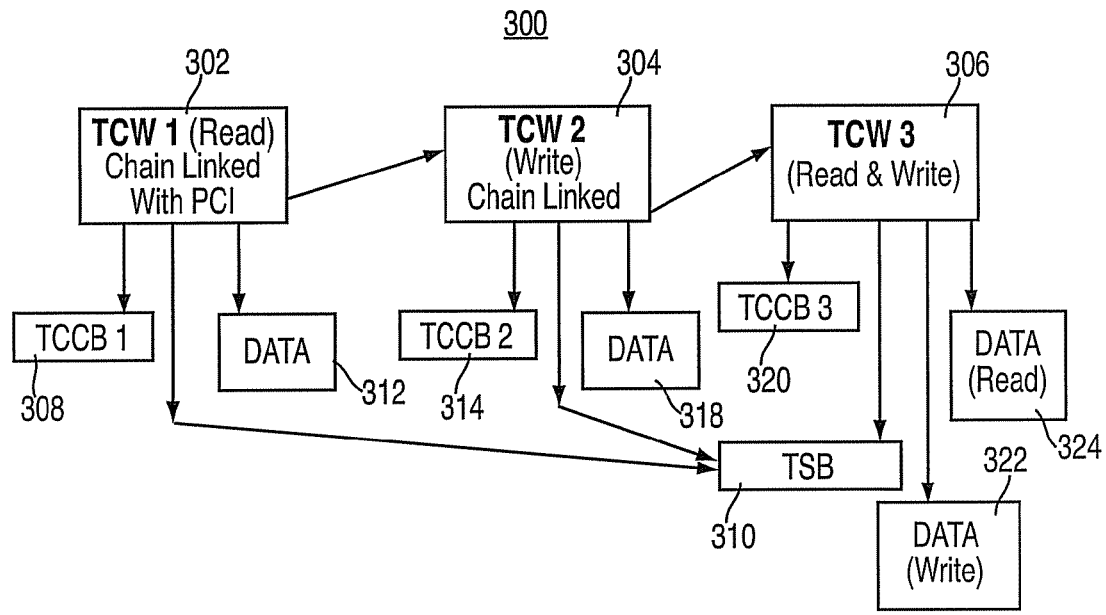
FIG. 3 depicts one embodiment of a chained transport control word (TCW) channel program, in accordance with an aspect of the present invention.

FIG. 3 depicts an embodiment of a chained TCW channel program 300 that includes TCWs 302, 304, and 306. TCW 302 is chain linked to TCW 304, and TCW 304 is chain linked to TCW 306. TCW 302 includes links to TCCB 308, a transport status block (TSB) 310, and data area 312. Similarly, TCW 304 includes links to TCCB 314, TSB 310, and data area 318. TCW 306 may include links to TCCB 320, TSB 310, and two data areas (write data area 322 and read data area 324). The various links to TCCBs, and data areas, such as TCCB 308, 314, and 320, can be direct or indirect references to areas of memory. For example, transport blocks and data areas 308 and 312-324 can be further subdivided into smaller blocks (contiguous or non-contiguous) and managed using indirect lists pointing to the smaller blocks. In an exemplary embodiment, TCCBs 308, 314, and 320 are sent from channel subsystem 108 of FIG. 1 to a targeted control unit 110 that parses and executes commands in TCCBs 308, 314, and 320. TSB 310 may remain at the channel subsystem 108 to hold status information associated with the execution of TCCBs 308, 314, and 320 at the control unit 110, enabling OSs 103 to access status information. The data areas 312, 318, 322, and 324 can be used to hold write data to send to the control unit 110 or read data received from the control unit 110.

In an exemplary embodiment, the chained TCW channel program 300 represents a single I/O operation that includes multiple commands chained across the TCWs 302-306 and TCCBs 308, 314, and 320. The TCWs 302-306 each include a TSB address pointing to the same TSB 310. If the I/O operation ends successfully, only the TSB address in the last TCW 306 is used by the channel 124; however, if the I/O operation ends early for whatever reason, the channel 124 can uses the TSB address in any TCW that the channel 124 may be working with, to obtain the memory address to store ending status in the TSB 310.

As depicted in FIG. 3, the TCW 302 also includes PCI support, indicating that a PCI will be generated upon completion of commands in the TCCB 308 at the control unit 110 executing the TCCB 308. It will be understood that the configuration of and number of TCWs 302-306 merely represents an embodiment, and is not limiting in scope, as there could be any number of TCWs chain linked with multiple or no PCIs as part of the chained TCW channel program 300.

Figure 4:
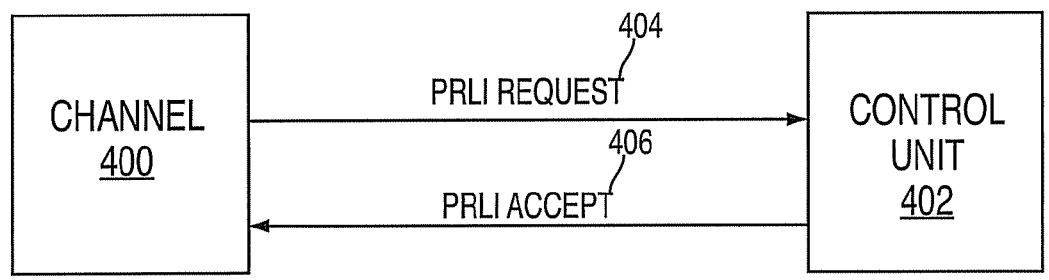
FIG. 4 depicts one embodiment of a link protocol used to identify a compatible control unit of an I/O processing system, in accordance with an aspect of the present invention.

In order to determine whether a control unit can support chain linked TCW channel programs, a compatibility link protocol may be employed prior to sending chain linked TCCBs to the control unit. An example of a compatibility link protocol is depicted in FIG. 4. Channel 400 sends a process login (PRLI) request 404 to the control unit 402 in a default communication format. The control unit 402 responds with a PRLI accept 406, which may include information defining communication parameters that are acceptable to the control unit 402. In response to receiving the PRLI accept 406, the channel may proceed with sending chain linked TCCBs to the control unit 402 for execution, such as chain linked TCCBs 308, 314, and 320. Other messages may also be exchanged between the channel 400 and the control unit 402 as part of link initialization and configuration. The channel 400 and the control unit 402 represent embodiments of the channel 124 and control unit 110 of FIG. 1.

Figure 5:
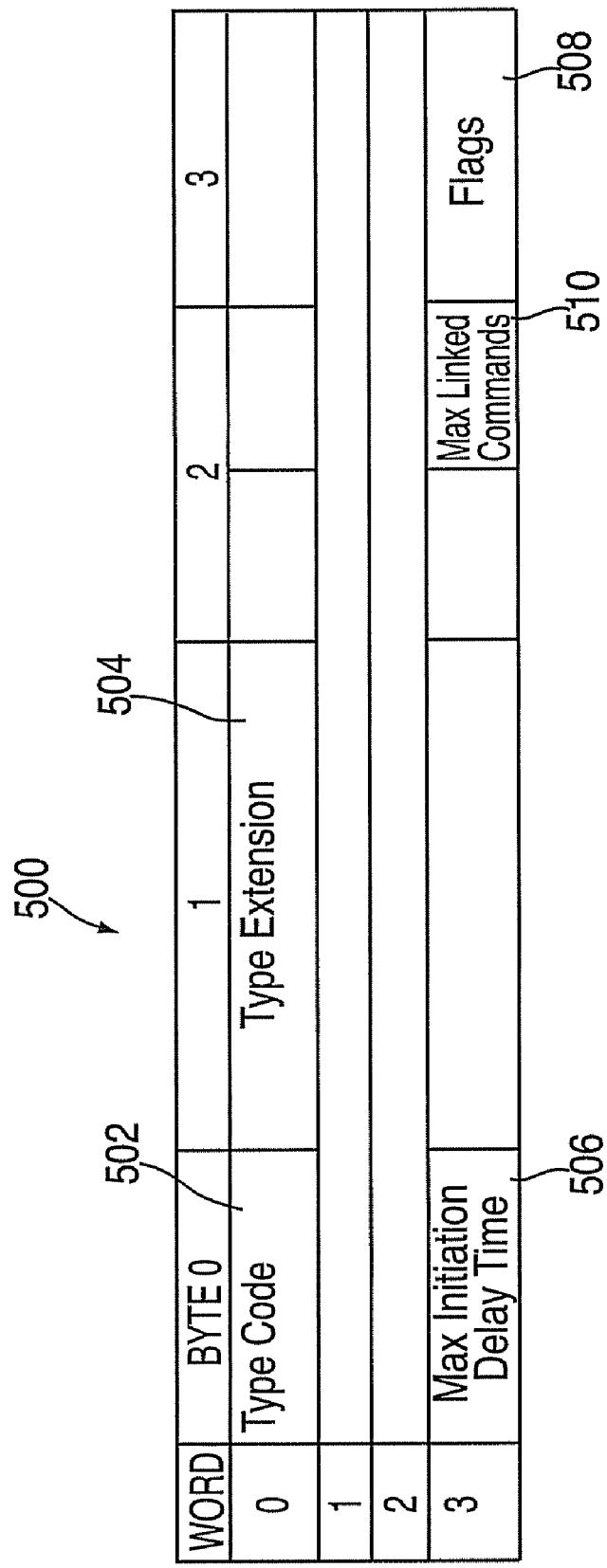
FIG. 5 depicts one embodiment of a request message of the link protocol of FIG. 4.

FIG. 5 depicts an example of a PRLI Request message 500, which represents an embodiment of the PRLI request 404 of FIG. 4. The payload of the PRLI Request message 500 may include a service parameter page, which includes service parameters for one or all image pairs.

The service parameter page of the PRLI Request message 500 may include multiple fields, such as type code 502, type extension 504, maximum initiation delay time 506, flags 508, and max linked commands 510. Each field in the page of the PRLI Request message 500 is assigned to a particular byte address. Although one arrangement of fields within the page of the PRLI Request message 500 is depicted in FIG. 5, it will be understood that the order of fields can be rearranged to alternate ordering within the scope of the disclosure. Moreover, fields in the page of the PRLI Request message 500 can be omitted or combined within the scope of the invention.

The type code field 502, located at word 0, byte 0, represents the protocol type code, such as the Fibre Channel Single Byte Protocol type code. For example, a value of "1B" hexadecimal in this byte indicates that this service parameter page 500 is defined in the selected protocol (e.g., Fiber Channel single byte). The type extension 504, located at word 0, byte 1, may further supplement the type code field 502.

The maximum initiation delay time field 506, located at word 3, byte 0, provides the maximum time (e.g., in seconds) that the channel 124 of FIG. 1 can allow in the Initiation Delay Time field in a process Logout (PRLO) from the control unit 110.

Flags 508, in an exemplary embodiment, has the following definition:

Bit 0—Transport Mode/Command Mode. A value of this bit set to one (1) means that the sender supports both Command Mode and Transport Mode. If the bit is set to zero (0), the sender only supports Command Mode. If the channel 124 sets this bit to a one, then the control unit 110 may respond with this bit set to one if it supports Transport Mode.

Bits 1-6—Reserved.

Bit 7—First Transfer Ready for Data Disabled. If both the channel 124 and control unit 110 choose to disable the first write transfer ready information unit (XFER_RDY IU), then the first TC_IU of all I/O operations performing writes between the channel 124 and control unit 110 operate without using the XFER_RDY IU before the first data information unit (Data IU) is transmitted for the first TC_IU of an I/O operation. The XFER_RDY IU is transmitted to request each additional Data IU, if any for the current TC_IU and any following TC_IUs for the channel program if any.

The max linked commands field 510 indicates the maximum count of additional Transport Command information units (TC_IUs) that the channel 124 supports for streaming to the control unit 110 as chain linked commands for the same I/O device 112 after the first TC_IU has been sent to the control unit 110. Values may range from 0 to 15, with a value of zero meaning that the channel 124 does not support chain linking of TC_IUs. A value of X equal to one to fifteen indicates that the channel 124 will send out X TC_TUs after the first TC_IU for the same I/O device 112 (if there are X TCWs chain linked together) and then send out one new TC_IU for each previous TC_IU that completed until the channel program is completely executed.

In one exemplary embodiment, the remaining fields in the page of the PRLI Request message 500 are reserved and/or set to zero (0). For example, bytes 2 and 3 of word 0, and words 1 and 2 are set to zero. Byte 1 and a portion of byte 2 of word 3 may also be reserved.

Figure 6:
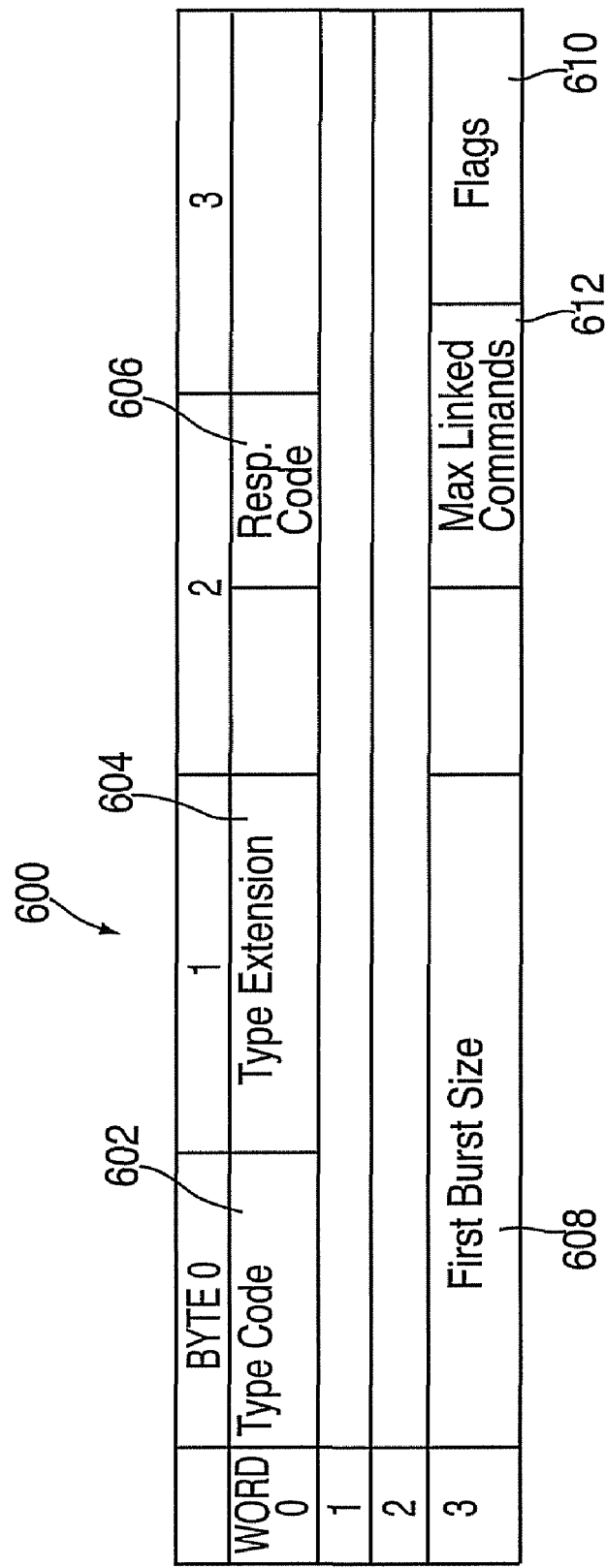
FIG. 6 depicts one embodiment of an accept message of the link protocol of FIG. 4.

Turning now to FIG. 6, an example of a PRLI Accept message 600 is depicted, which represents an embodiment of the PRLI accept 406 of FIG. 4. The payload of the PRLI Accept message 600 may include a service parameter page. The service parameter page of the PRLI Accept message 600 may include multiple fields, such as type code 602, type extension 604, response code 606, first burst size 608, flags 610, and max linked commands 612. Each field in the page of the PRLI Accept message 600 is assigned to a particular byte address. Although one arrangement of fields within the page of the PRLI Accept message 600 is depicted in FIG. 6, it will be understood that the order of fields can be rearranged to alternate ordering, or can be omitted or combined, within the scope of the disclosure.

The type code field 602, located at word 0, byte 0, is the protocol type code, and is similar to the type code field 502 of FIG. 5. The type extension field 604, located at word 0, byte 1, corresponds to the type extension field 504 of FIG. 5.

The response code field 606, located at word 0, byte 2, bits 4-7, is defined by its corresponding protocol, such as the Fibre Channel Framing and Signaling protocol (FC-FS), which is described further in "ANSI INCITS 433-2007, Information Technology Fibre Channel Link Services (FC-LS)", July 2007, which is hereby incorporated herein by reference in its entirety.

The First Burst Size field 608, located at word 3, bytes 0-1, bits 0-15, provides the maximum amount of data (e.g., the maximum number of 4 k byte blocks of data) allowed in the first Data IU that is sent immediately after the first TC_IU, when the First Transfer Ready for Data Disabled flag bit (word 3, byte 3, bit 7) is set to one. A value of zero in this field indicates that there is no specified first burst size.

Flags 610 are similar to the flags 508 of FIG. 5 described in conjunction with the PRLI Request message 500. The control unit 110 sets values to these flags that correspond to the mode of operation it will run with the channel 124.

In an exemplary embodiment, the max linked commands field 612 is the maximum count of streamed TC_IUs that the control unit 110 supports for one I/O operation. The control unit 110 responds with a count equal to or less than the value the channel 124 sent to the control unit 110 in the service parameter page for the PRLI Request message 500. The channel 124 uses the count received from the control unit 110 as the maximum number of linked TC_Us queued at the control unit 110. If the control unit 110 responds with a count of zero, this means the control unit 110 does not support chain linking of TC_IUs.

In one exemplary embodiment, the remaining fields in the page of the PRLI Accept message 600 are reserved and/or set to zero (0). For example, bits 1-3 of word 0, byte 2, and words 1 and 2 are set to zero. Byte 3 of word 0 is reserved and set to zero. A portion of byte 2 of word 3 may also be reserved.

Figure 7:
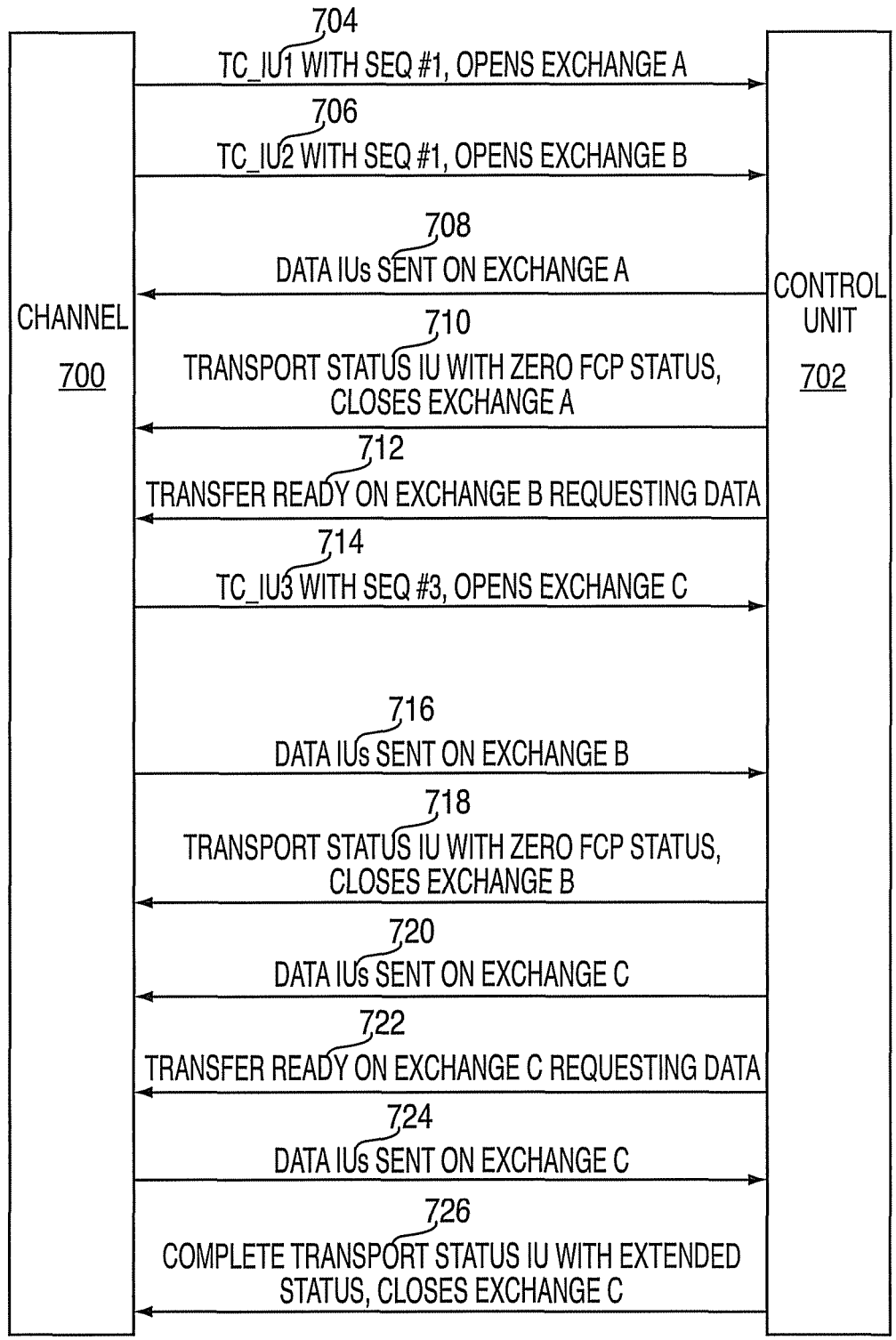
FIG. 7 depicts one embodiment of a link protocol used to communicate between a channel and control unit to execute the chained TCW channel program of FIG. 3, in accordance with an aspect of the present invention.

Once the channel 124 and the control unit 110 establish that Transport Mode is supported and the maximum number of linked commands is established, a TCW channel program with chain linking can be executed. FIG. 7 depicts one embodiment of a link protocol used to communicate between a channel 700 and control unit 702 to execute the chained TCW channel program of FIG. 3, where the channel 700 and control unit 702 are embodiments of the channel 124 and control unit 110 of FIG. 1. An OS, such as OS 103 of FIG. 1, builds the TCWs 302, 304 and 306 associated control blocks TCCB 308, 314, and 320 shown in FIG. 3 and executes a start subchannel command with an address in an operation request block that points to TCW 302. This results in the channel 700 fetching TCW 302 and the associated TCCB 308. In an exemplary embodiment, TCCB 308 includes one or more DCW read commands, TCCB 314 includes one or more DCW write commands, and TCCB 320 includes DCW read and write commands.

The channel 700 sends TCCB 308 in TC_IU 704, opening exchange A with a sequence number of one to the control unit 702. In this example, a chain linked flag bit is set to one in the TCW 302, indicating that the TCW 302 is chain linked to another TCW (TCW 304) as defined by a next TCW address field in the TCW 302. Further, assume in this example that upon executing the compatibility link protocol of FIG. 4, the control unit 702 provides a max linked commands value of one (e.g., max linked commands 612 of PRLI Accept message 600), indicating that one additional TC_IU can be streamed before providing a response. Therefore, the channel 700 fetches TCW 304 and associated TCCB 314, sending TCCB 314 in TC_IU 706, with a sequence number of two in exchange B to the control unit 702. Because the max linked commands number is a one, TCCB 320 cannot be sent to the control unit 702 until a response is received from the control unit 702 for TC_IU 704.

Although the two TC_IUs 704 and 706 are sent one right after the other on a fibre channel link, each as a separate exchange to the control unit 702, the TC_IUs 704 and 706 may arrive at the control unit 702 in a different order than they were sent, as communication can be in parallel. The control unit 702 analyzes the sequence numbers in the TC_IUs 704 and 706 that are received to determine the order of execution, completing the first TC_IU (TC_IU 704) before executing the next TC_IU (TC_IU 706) with a sequence number one greater than the previous TC_IU (TC_IU 704). A Chain linked TCCB flag bit is set to one in the TC_IU 704, which informs the control unit 702 that the channel 700 is sending at least one more TC_IU (TC_IU 706) with a sequence number one greater than the current sequence number. The control unit 702 executes TC_IU 704 at an I/O device (e.g., I/O device 112 of FIG. 1) targeted by read DCW commands in the TC_IU 704, and sends the data read from the targeted I/O device to the channel 700 as data IUs 708 on exchange A.

The control unit 702 also sends a transport response IU 710 with zero FCP status that closes exchange A and informs the channel 700 that TC_IU 704 has completed. The control unit 702 continues with the execution of TC_IU 706. In an exemplary embodiment, the transport response IU 710 is a basic status message that conveys minimal information, e.g., a 24-byte status message. This is contrasted against a more elaborate transport response IU with extended status that provides more comprehensive information and may be much greater in length, e.g., 48 to 64 (or more) bytes, at the conclusion of an I/O operation.

The control unit 702 sends a Transfer Ready IU 712 on exchange B to request data for one or more write DCW commands in the TC_IU 706. Since the channel 700 has received a response from the control unit 702 for TCW 302, the Max Linked Commands number no longer is blocking the channel 700 from sending the next TCCB (TCCB 320) to the control unit 702, where TCW 304 has a chain linked flag bit set to a one. Thus, the channel 700 fetches TCW 306 and sends TCCB 320 in TC_IU 714, opening exchange C with a sequence number of three, to the control unit 702. A chain linked flag bit is not set to one in the TCW 306, making TC_IU 714 the final TC_IU in the chain that the channel 700 sends to the control unit 702.

A PCI flag bit in the TCW 302 is set to one, indicating that intermediate status should be provided to the OS (e.g., OS 103) upon completion of the TCCB 308. In response to receiving the transport response IU 710, the channel 700 presents an intermediate status interrupt to the OS.

The channel 700 sends the data requested by the control unit 702 for TC_IU 706 to the control unit 702 as Data IUs 716 in exchange B. The control unit 702 uses data in the Data IUs 716 to complete execution of commands in the TC_IU 706. The control unit 702 sends a Transport Response IU 718 with zero FCP status to close exchange B and to inform the channel that TC_IU 706 has completed.

The control unit 702 executes TC_IU 714 at the targeted I/O device (e.g., I/O device 112) and sends data read from the I/O device as requested in read DCW commands of the TC_IU 714, to the channel 700 as Data IUs 720 on exchange C. The control unit 702 then sends a Transfer Ready IU 722 to request data for write DCW commands in TC_IU 714. The channel 700 sends the data requested by the control unit 702 for TC_IU 714 to the control unit 702 as Data IUs 724 on exchange C. When the control unit 702 has completed writing the data to the I/O device that was received from the channel 700, the control unit 702 sends a Transport Response IU 726 that includes extended status to the channel 700. The Transport Response IU 726 closes exchange C and informs the channel 700 that the entire I/O operation has completed. The final status may be written to the TSB 310 of FIG. 3. The channel 700 can present the final status to the OS, informing the OS that the I/O operation is now completed.

In an exemplary embodiment, extended status includes various timing parameters that can be continued between TC_IUs, such as TC_IUs 704, 706 and 714, as calculated using CU timers 206 of FIG. 2. For example, extended status can include a total device time parameter, defer time parameter, queue time parameter, device busy time parameter, device active only time parameter, and appended device sense data. The total device time parameter is the elapsed time from when the control unit 702 received the TC_IU 704 until sending the transport response IU 726 for the I/O operation. The defer time parameter indicates control unit defer time. This is the time accumulated by the control unit 702 working with the I/O device (e.g., I/O device 112) when no communication with the channel 700 is performed. The queue time parameter is the time that an I/O operation is queued at the control unit 702, but does not include queue time for device busy time where the I/O device is reserved by another channel 700 under control of a different OS (e.g., OS 103) on the same system or on another system. The device busy time parameter is the time that a TC_IU is queued at the control unit 702 waiting on a device busy caused by the I/O device being reserved by another channel 700 under control of a different OS on the same system or on another system. The device active only time parameter is the elapsed time between a CE and a DE at the control unit 702, when the control unit 702 holds the CE until DE is available. The appended device sense data is supplemental status that the control unit 702 provides conditionally in response to an active unit check (UC) bit in the device status.

An exemplary embodiment of a transport control word (TCW) 800 is depicted in FIG. 8. The TCW 800 may be utilized by the channel 124 of FIG. 1 to set up the I/O operation and is not sent to the control unit 110. The TCW depicted in FIG. 8 provides for both input and output data within a single I/O operation. The TCW 800 illustrates formatting that can be used for a variety of TCWs, such as TCWs 302, 304, and 306 of FIG. 3.

In the exemplary TCW 800 depicted in FIG. 8, a format field 802 equal to "00" binary indicates that what follows is a standard TCW 800, with other values (e.g., 01, 10, 11) equating to TCW format variations. The TCW 800 may include reserved bits 804 for possible future use.

The TCW 800 also includes a flags field 806. Reserved flags in the flags field 806 may be set to zero. Examples of flags bits that are mapped to the flags field 806 include a chain linked flag bit, a PCI flag bit, a TIDAL read flag, a TCCB TIDAL flag, and a TIDAL write flag.

When the chain linked flag bit set to a one, this informs the channel 124 that the next TCW address field 828 is to be used as the next TCW to be executed for the continuation of the I/O program. Counters, timers, and status tracking (e.g., CU timers 206 and/or CHN subsystem timers 212 of FIG. 2) can continue from one TCCB to the next TCCB when the chain linked flag is set to a one, such as between TCCBs 308, 314, and 320. Exchanges may be closed by the control unit 110 for the intermediate TCCBs that were executed successfully with an equivalent of FCP zero status in the associated transport response IU, as described in the example of FIG. 7. A full transport response IU with extended status is not transferred until the last TCCB of the chain linked channel program is executed or until the control unit 110 encounters an early end condition. Since the TCW 800 remains local to the channel 124, the state of the chain linked flag can be sent to the control unit 110 as a chain linked TCCB flag in a TCCB as part of a TC_IU.

If the chain linked flag and the PCI flag are set, the channel 124 generates an intermediate status interrupt when the TCW 800 is completed. This may result in marking the associated sub-channel as Sub-channel Active, Device Active and intermediate status pending.

In an exemplary embodiment, the TIDAL read flag is set to one when input-data address field 818 contains an address of a TIDAL. If the TIDAL read flag is set to zero, then the input-data address field 818 contains a data address. In an exemplary embodiment, the TCCB TIDAL flag is set to one when TCCB address field 822 contains an address of a TIDAL. If the TCCB TIDAL flag is set to zero, then the TCCB address field 822 directly addresses the TCCB. The TCCB TIDAL flag allows the operating system software or hypervisor to layer function and prefix user channel programs. In an exemplary embodiment, the TIDAL write flag is set to one when output-data address field 816 contains an address of a TIDAL. If the TIDAL write flag is set to zero, then the output-data address field 816 contains a data address.

The TCW 800 also includes a TCCB length field 810 which indirectly represents the length of the TCCB and may be utilized to determine the actual length of the TCCB.

Read/write bits 812 in the TCW 800 are utilized to indicate whether data is being read and/or written as a result of executing the TCW 800. In an exemplary embodiment, the read bit in the read/write 812 bits is set to one to indicate that input data is being transferred from an I/O device 112 to system storage (e.g., main memory 102) in the host system 101 as a result of executing the TCW 800. The write bit in the read/write bits 812 is set to one to indicate that output data is being transferred from system storage (e.g., main memory 102) in the host system 101 to an I/O device as a result of executing the TCW 800. The TCW 306 of FIG. 3 is an example of a TCW with reads and writes.

The output-data address field 816 includes the address for the output data (if any). As described previously, the contents of the output-data address field 816 may be an address of a TIDAL for output data (e.g., an indirect address) or the actual address of the output data (e.g., a direct address). The input-data address field 818 includes the address for the input data (if any). As described previously, the contents of the input-data address field 818 may be an address of a TIDAL for input data or the actual address of the input data.

The TCW 800 also includes a transport-status-block address field 820. A portion (e.g., the extended status part) of a completion status in a transport response IU for an I/O operation is stored at this address. The TCCB address field 822 in the TCW 800 includes an address where the TCCB is located in system storage. As described previously, the TCCB is the control block where the DCWs to be executed for the TCW 800 reside. Also as described previously, the contents of the TCCB address field 822 may be an address of a TIDAL for the TCCB or the actual address of the TCCB.

The output count field 824 in the TCW 800 indicates the amount of output data to be transferred by the TCW/TCCB for an output operation. In an exemplary embodiment, the output count field 824 specifies the number of bytes in the output storage area designed by the TCW (the output-data address 816) to be transferred. The input count field 826 in the TCW 800 indicates the amount of input data to be transferred by the TCW/TCCB for an input operation. In an exemplary embodiment, the input count field 826 specifies the number of bytes in the input storage area designed by the TCW (the input-data address 818) to be transferred.

The next TCW address field 828 is added to the TCW 800 that has the chain linked flag bit set in the flags field 806. The next TCW address field 828 is used to point to the address of the next TCW to be executed as part of a chain, such as that depicted in FIG. 3.

The interrogate-TCW address field 830 contains the address of another TCW and is used by the channel 124 to interrogate that state of an operation under the initiative of a cancel sub-channel I/O instruction.

The TCW 800 depicted in FIG. 8 is one example of how a TCW can be configured. Other configurations are possible where additional fields are included and/or fields depicted in FIG. 8 are not included.

One example of a command message 900, e.g., a transport command IU, communicated from the channel subsystem 108 to the control unit 110 to execute a TCW channel program is depicted in FIG. 9. The command message 900 illustrates formatting that can be used for a variety of TC_IUs, such as TC_IUs 704, 706, and 714 of FIG. 7. The command message 900 includes a header 902, a transport command header (TCH) 904, a transport command area header (TCAH) 906, a transport command area (TCA) 908, and a transport command area trailer (TCAT) 910. In an exemplary embodiment, the TCCBs 308, 314, and 320 of FIG. 3 utilize formatting as depicted in the TCAH 906, TCA 908, and TCAT 910.

The header 902 may include multiple words as address header 912, defining the highest level of header in the command message 900. The header 902 may include information such as channel and control unit image IDs and a device address.

The TCH 904 includes a sequence number 913. The sequence number 913 informs the control unit 110 of the order to execute multiple command messages 900 (e.g., TC_IUs 704, 706, and 714 of FIG. 7) that are all part of the same channel I/O operation targeting an I/O device (e.g., I/O device 112). The sequence number 913 starts at (01 h) in the first TC_IU for each start to the I/O device 112 independent of the value it ended on for the last start to the same I/O device 112. If an I/O operation only contains one TCW/TCCB, then the value of the sequence number 913 is set to zero. The TC_IUs chain linked together are executed in the order of the sequence numbers, even if the TC_IUs are received at the control unit 110 out of order.

The TCH 904 includes task information 914, which may be set to a reserved value, e.g., zero, while operating in transport mode. The TCH 904 also includes L1 length 916 and read/write field 918. The L1 length 916 defines the length of the TCA 908 in words+1. The L1 length 916 can be used to limit and define the size of the TCA 908. The read/write field 918 defines whether read data, write data, or no data is being transferred in the command message 900, where a read is a transfer from the control unit 110 to the channel subsystem 108.

The TCAH 906 includes format field 920 and control field 922. The format field 920 and control field 922 may be set to fixed values, such as 7F hexadecimal and zero respectively, to indicate that a variable length format is used, as defined by SPC-4. SPC-4 is further described in "SCSI Primary Commands—4 (SPC-4)", Project T10/1731-D, Rev 11, INCITS (May 2007), which is hereby incorporated herein by reference in its entirety. The TCAH 906 additionally includes reserved fields 924 and 926, TCCB-flags 927, as well as L2 length 928.

The TCCB-flags 927 inform the control unit 110 about the characteristics of the command message 900 (the current TC_IU). The TCCB-flags 927 may include a chain linked TCCB flag bit. The chain linked TCCB flag set to a one informs the control unit 110 that there is another TC_IU following the current TC_IU that is part of the same I/O operation. Counters, timers, and status tracking (e.g., CU timers 206 and/or CHN subsystem timers 212 of FIG. 2) can continue from one TCCB to the next TCCB when the chain linked TCCB flag is set to a one, and a CC bit is set to a one in the last DCW (e.g., DCW 946) in the TCA 908 for this TC_IU. The exchange may be closed when the TC_IU is executed successfully with an equivalent of FCP zero status, which equates to channel end (CE), device end (DE) only status. The CE may indicate that a portion of the I/O operation involving a transfer of data or control information between the channel 124 and the control unit 110 has been completed. The DE may indicate that a device portion of an I/O operation is completed. No extended status is transferred until the last TC_IU for the TCW channel program is executed or for the TC_IU that ended the TCW channel program. The channel 124 sends the next TC_IU to the control unit 110 based on the value of a TC_IU streaming count, which can be tracked in the CHN subsystem registers 214 of FIG. 2. The channel 124 sends TC_IUs up to the max linked commands (e.g., max linked commands 612), and then send the subsequent TC_IUs as each previous TC_IU is completed.

The L2 length 928 is also referred to as transport-command-area length (TCAL), and may represent the number of bytes after this position in the command message 900. The L2 length 928 limits the size of the TCA 908. The TCAH 906 further includes a service action code 930, reserved field 932, priority 934, and reserved field 936. The service action code 930 defines the type of DCWs used in the TCA 908. The priority 934 can be set equivalent to a priority byte of a FICON command header as defined in FC-SB-3.

The TCA 908 includes DCW one and control data 940, DCW two 942, DCW three 944, and DCW four 946. The DCW one and control data 940 includes DCW fields such as a command 948, flags field 950, a reserved field 952, control data (CD) count 954, and data byte count 956. The command 948 may be equivalent to a CCW command byte, but directly interpreted by the control unit 110 rather than the channel subsystem 108. The flags field 950 includes reserved bits as well as one or more bits assigned to particular functions, such as indicating whether an additional DCW exists in the TCA 908 as part of a command chain. The flags field 950 may also include a pad flag bit, command chain (CC) flag bit, and a suppress incorrect length (SLI) flag bit.

The pad flag bit adds padding on read short counts. If the pad and SLI flag bits are set to one and the command 948 is a read, the associated data (e.g., data IUs 708 associated with TC_IU 704) are filled with zeros to the end of the data byte count 956 if the record is shorter than the data byte count 956. In an exemplary embodiment, padding on a read is not performed if the SLI flag bit is not set to a one. The pad flag bit is a "don't care" for write DCWs.

Software can make the count fields in the DCWs consistent with TIDAL counts fields. The data stream between the channel 124 and control unit 110 is aligned to the DCW counts in the TCA 908 even if the record is shorter than the count field. To allow the TCW channel program to continue when the record is short and software set the SLI flag bit, the pad flag bit is set to allow the control unit 110 to pad out the data stream with zeros until the count field in the DCW is satisfied (e.g., data byte count 956). For example, if a read command requests 4 kilobytes of data, but the record on the I/O device 112 is only 2 kilobytes in length, the control unit 110 can insert additional zeros to pad the returned data IU to 4 kilobytes of data. The exception to this is for the last DCW in the TCA 908 (e.g., DCW 946) or the last DCW executed in the TCA 908 should execution terminate early.

If for any reason the control unit 110 cannot satisfy the DCW byte count 956, in terms of the bytes of data sent to, or received from the channel 124 on a DCW that is not the last DCW of the TCA 908, the control unit 110 ends at a DCW with an incorrect length flag bit set in a status flags byte of the transport response IU.

The CC flag bit indicates a command chain to the next DCW in the TCA 908. The CC flag bit set to zero means that the associated DCW is the last DCW of the program. The CC flag bit can be set in the last DCW of the TCA 908 if the chain linked TCCB flag is set in the TCCB-flags field 927 and the chain linked flag bit is set in the flags field 806 in the TCW 800.

The SLI flag bit may be used for long record writes or reads, where a long record is larger than the DCW count (e.g., greater than data byte count 956), and short records on write and short record on reads if the pad flag bit is set to a one.

When the SLI flag bit is set to a one, the data byte count 956 of data is transferred on a write, even if the data is not used by the control unit 110. If the SLI flag bit is not set to a one, then the chain is ended if an early end condition is encountered. However, data may be requested up to the next cyclic redundancy check (CRC) checking boundary in order to check the CRC on the data already received before the data can be committed to media.

The SLI flag bit may be set for short record reads if the pad flag bit is set to a one or it is the last DCW in TCA 908. The SLI flag bit does not suppress incorrect length for short records on a read DCW unless the DCW is the last DCW in a DCW list or the pad flag bit is set to a one. When the pad flag bit is also set to a one, the control unit 110 pads out the record with zeros until the DCW count goes to zero. This keeps byte counts in the TC_IU synchronized with TCW and TIDAL byte counts at the channel 124.

The CD count 954 is the byte count of control data 958. The CD count 954 may be padded up to the next 4-byte boundary so that subsequent DCWs start on a 4-byte boundary. The data byte count 956 is a four-byte count of data without padding, e.g., customer data. The control data 958 exists when the CD count 954 is not zero. In the exemplary command message 900, the DCW two 942, DCW three 944, and DCW four 946 contain substantially similar fields as the DCW one and control data 940. For example, command 960, 970, and 980 are formatted in a similar fashion as the command 948. Furthermore, flags field 962, 972, and 982 are formatted similar to the flags field 950. Additionally, CD count 966, 976, and 986 are formatted similar the CD count 954, and data byte count 968, 978, and 988 are similarly formatted to the data byte count 956. Although only four DCWs, including one DCW with control data (i.e., DCW one and control data 940) are depicted in the command message 900, it will be understood that a varying number of DCWs with and without control data can be included in the command message 900, including a single DCW.

The TCAT 910 includes a longitudinal redundancy check (LRC) word 990 calculated on the entire command message 900. The LRC word 990 can be generated through applying an exclusive-or operation to an initial seed value with each field included in the LRC calculation in succession. The TCAT 910 also includes a transport data byte count 992 indicating the total number of bytes transferred for a read or write I/O operation. If both the read and write bits are active in read/write field 918, then the transport data byte count 992 is for the write data, and bidirectional read data length 994 in TCAT 910 is the read transport data byte count.

Unusual ending conditions may be handled as follows when multiple TCWs/TCCBs are chained to form a chain-linked TCW channel program. For chain linked TCWs channel programs, a halt subchannel command causes all active exchanges to be aborted for the I/O device 112 and the subchannel to be returned to the OS 103 with primary, secondary and alert status. A clear subchannel command for chain-linked TCW channel programs may cause all active exchanges to be aborted for the I/O device 112, followed by sending a selective reset command to the I/O device 112.

For the case where the channel 124 is sending multiple TCCBs (in TC_IUs) chain linked together to the control unit 110, if the control unit 110 cannot execute any one of the TCCBs, the control unit 110 can send terminating ending status, busy status (can only be sent in response to the first TC_IU of a channel program) or retry status, with a status confirm, on the exchange for the TCCB that is ending early. The control unit 110 also closes other outstanding exchanges for the same I/O operation, which have a sequence number greater than the sequence number of the exchange on which the terminating status was sent. When the channel 124 detects a terminating ending status IU with the request for a confirm request, the channel 124 stops sending new TCCBs to the control unit 110 for that operation. All other exchanges for that I/O operation that are not closed after a timeout period (for example, 100 milliseconds) are aborted by the channel 124. When all of the other exchanges are closed for the I/O operation, the channel 124 sends the confirm message, which closes the final exchange.

If one of the exchanges, out of many that were opened to send TCCBs chain linked together to the control unit 110 is lost, the channel 124 times out that exchange and send a Read Exchange Concise (REC) to the control unit 110 inquiring about the exchange. If the control unit 110 informs the channel 124 that it does not have the exchange, the channel 124 aborts outstanding exchanges to the control unit 110 for the I/O operation.

Figure 10:
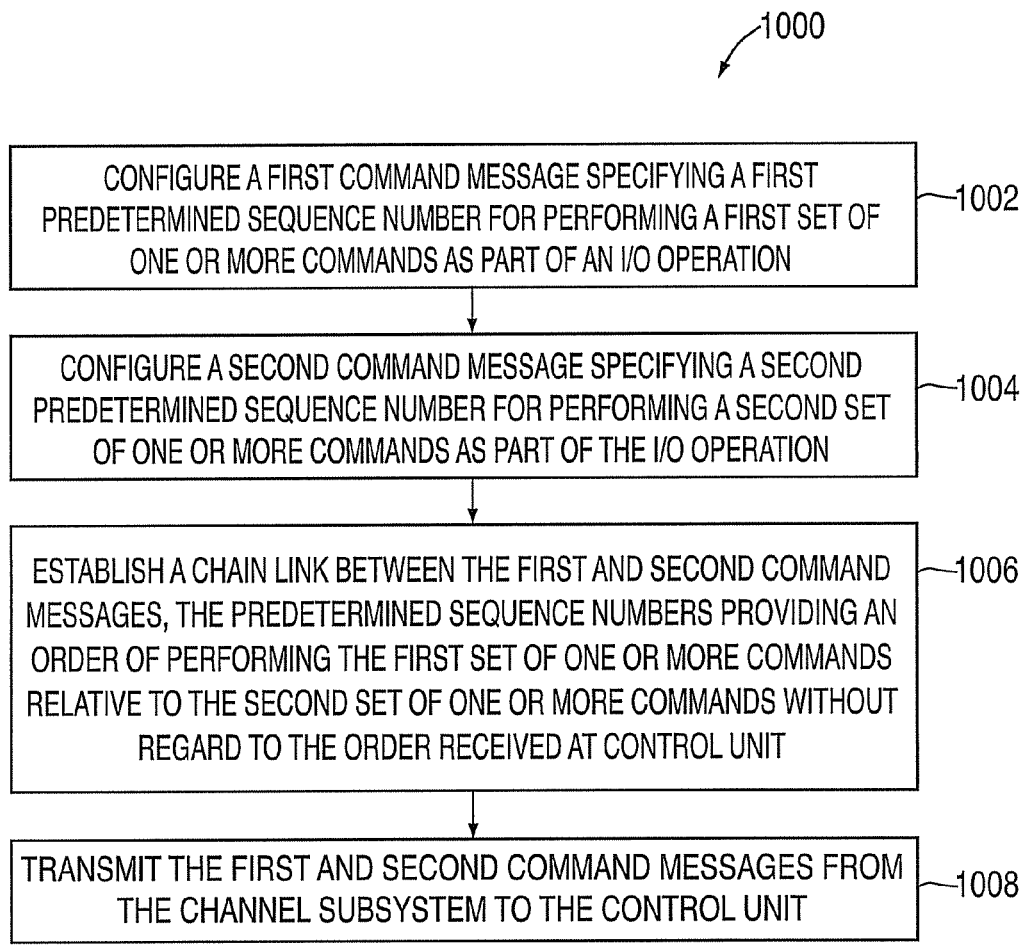
FIG. 10 depicts one embodiment of a process for providing TCW channel program chain linking at a channel subsystem in accordance with an aspect of the present invention.
Figure 11:
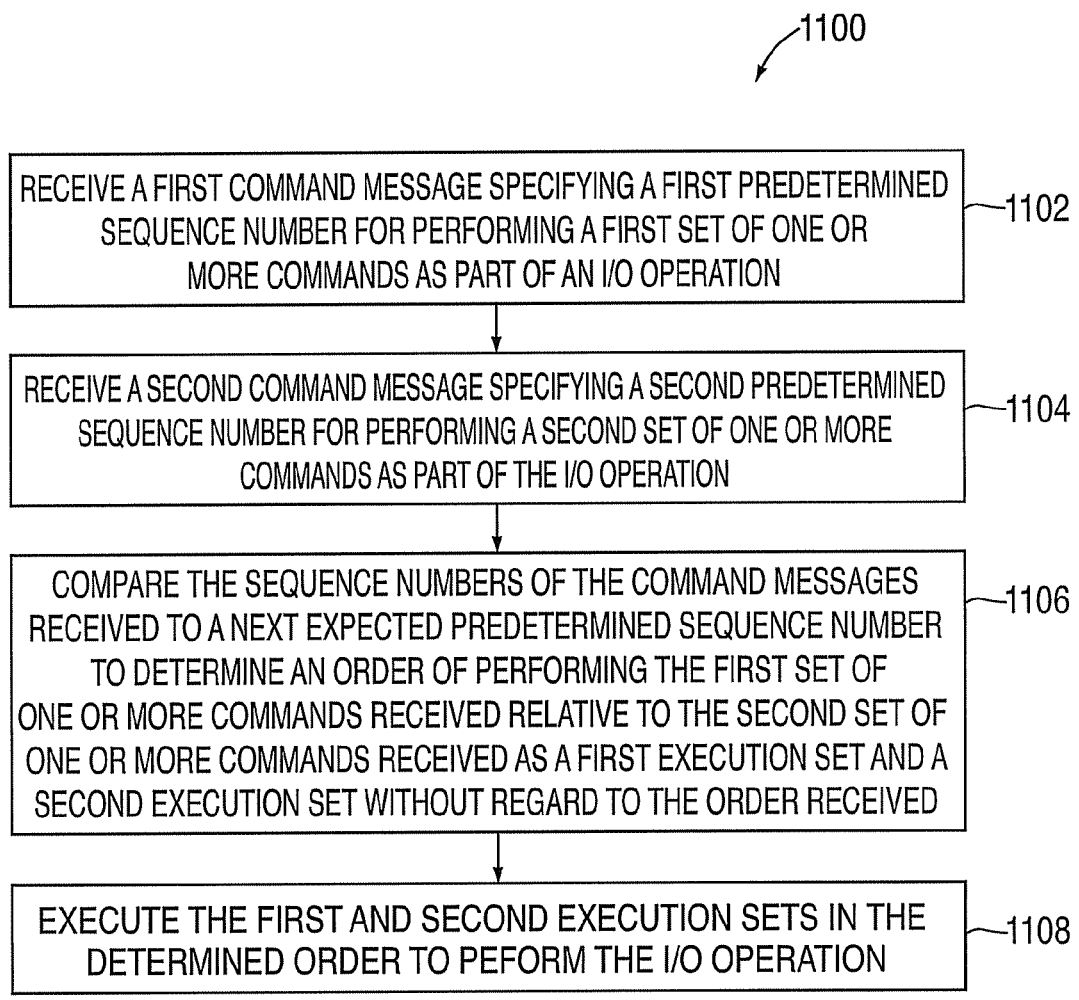
FIG. 11 depicts one embodiment of a process for providing TCW channel program chain linking at a control unit in accordance with an aspect of the present invention.

FIG. 10 depicts a process 1000 for providing TCW channel program chain linking at a channel subsystem in accordance with an exemplary embodiment, and is described in reference to the I/O processing system 100 of FIG. 1 and subsequent figures. The process 1000 is also described in conjunction with process 1100 as depicted in FIG. 11 for providing TCW channel program chain linking at a control unit, such as between channel 124 of channel subsystem 108 and control unit 110 of FIG. 1. At block 1002, the channel 124 of channel subsystem 108 configures a first command message specifying a first predetermined sequence number for performing a first set of one or more commands as part of an I/O operation. At block 1004, the channel 124 of channel subsystem 108 configures a second command message specifying a second predetermined sequence number for performing a second set of one or more commands as part of the I/O operation. At block 1006, the channel 124 of channel subsystem 108 establishes a chain link between the first and second command messages, the predetermined sequence numbers providing an order of performing the first set of one or more commands relative to the second set of one or more commands without regard to the order received at the control unit 110. At block 1008, the channel 124 of channel subsystem 108 transmits the first and second command messages from the channel 124 of channel subsystem 108 to the control unit 110.

At block 1102, the control unit 110 receives the first command message from channel 124 of the channel subsystem 108. The first command message specifies a first sequence number for performing a first set of one or more commands as part of the I/O operation, such as TC_IU 704 of FIG. 7 with formatting as depicted in FIG. 9.

At block 1104, the control unit 110 receives the second command message from channel 124 of the channel subsystem 108. The second command message specifies a second sequence number for performing a second set of one or more commands as part of the I/O operation, such as TC_IU 706 of FIG. 7 with formatting as depicted in FIG. 9.

At block 1106, the control unit 110 compares the sequence numbers in the received commands to a next expected predetermined sequence number to determine an order of performing the first set of one or more commands received relative to the second set of one or more commands received as a first execution set and a second execution set without regard to the order received. In other words, the sequence numbers govern the order of execution rather than the order that the command messages are received. Therefore, the first execution set can be the commands of the first command message received or the second command message received depending on the sequence numbers. This also applies as greater numbers of messages are received at the control unit 110. For this example, the next expected predetermined sequence number of the first command message of a new I/O operation that has the chain linked flag bit set to a one is "01" hexadecimal. The CU chain logic 204 determines the next expected predetermined sequence number by tracking the sequence numbers of the commands received relative to an incremental count value. Thus, if the control unit 110 receives a message with a sequence number of 2 prior to receiving a message with a sequence number of 1, the control unit 110 waits for a message with a sequence number of 1 prior to executing the message with the sequence number of 2, as 2 was not the next expected predetermined sequence number.

At block 1108, the control unit 110 executes the first and second execution sets in the determined order to perform the I/O operation. This maintains the proper sequence of commands for the I/O operation, regardless of the order in which the command messages are received.

The control unit 110 can read a chain linked flag (e.g., chain linked TCCB flag in TCCB-flags 927 of FIG. 9) in the first command message to determine whether a subsequent command message is expected to follow the first command message as part of the I/O operation, such as the second command message. In response to determining that the subsequent command message is expected, and upon executing the first set of one or more commands received, the control unit 110 may continue to run counters associated with the I/O operation to span multiple command messages (e.g., CU timers 206), and transmit a transport response message without extended status. In similar fashion, each command message received can be analyzed to determine whether additional command messages are expected as part of the chained I/O operation. The control unit 110 receives the subsequent command message including a subsequent set of one or more commands, and examines command chain flags associated with each command (e.g., CC bits of the DCW flags 950, 962, 972, and/or 982) in the subsequent set of one or more commands received to locate a final chain linked command. The control unit 110 transmits a response message with extended status for the I/O operation in response to locating and executing the final chain linked command, in which case the subsequent command message is the final command message of the chain. Shorter status messages communicated as transport response messages without extended status can provide the channel 124 with intermediate status after each command message is executed prior to the final command message, triggering a PCI at the channel 124, which can be output to the OS 103. Upon executing the commands of the final command message, extended status is transmitted that provides additional information and status for the full I/O operation.

Various commands can be included as DCWs 940-946 in the command messages, for instance read and write commands targeting I/O device 112. When the control unit 110 executes a read command, it may determine that a record of data associated with the read command is smaller than a data count value (e.g., data byte count 956). The control unit 110 can check a pad flag associated with the read command in the flags 950, 962, 972, and/or 982. The control unit 110 inserts pad data in a data message (e.g., one or more of data IUs 708) in response to assertion of the pad flag (for example, set to one). The pad data may be inserted up to the data count value, for instance, the value of data byte count 956, 968, 978, and/or 988. This keeps communications and buffers aligned between the control unit 110 and the channel 124. The control unit 110 may also compare the record length relative to the data count value for read or write commands, and check the SLI flag in the flags 950, 962, 972, and/or 982. The control unit 110 can suppress identification of an incorrect length condition in response to assertion of the SLI flag when the record length does not match the data count value. The relationship between the pad and SLI flag bits may be as previously described.

The control unit 110 can also handle other error conditions. For example, the control unit 110 may determine that one or more commands associated with a communication exchange cannot execute. The control unit 110 can respond sending a termination status message to the channel 124 of the channel subsystem 108 indicating an inability to execute. The control unit 110 closes open communication exchanges with sequence numbers greater than the sequence number associated with the one or more non-executable commands. For example, if the control unit 110 has received sequence numbers 1, 2, 3, and 4 on exchanges A, B, C, and D, and an error occurs in executing commands associated with sequence number 2, the control unit 110 can notify the channel 124 of the error on exchange B with extended status, with a request for a confirm, on exchanges B and closes exchanges C, and D. The channel 124 will close exchange B with a confirm on exchange B after it has seen that exchanges A, C and D have been closed (assuming A closes after successful completion of sequence 1 commands).

Technical effects of exemplary embodiments include chaining of multiple TCW and TCCBs together to form a transport control channel program that spans multiple TCWs and TCCBs for an I/O operation. Chain linking also allows periodic status interrupts to be sent while a transport control channel program is executing but not fully complete. Periodic status enables the host to confirm that a number of commands have executed and thus buffers associated with the commands that have completed can be released or reused without waiting for the full program to complete. Additionally, support is provided for inserting padding and suppressing incorrect length issues that may be associated with sending undersized or oversized records.

Figure 12:
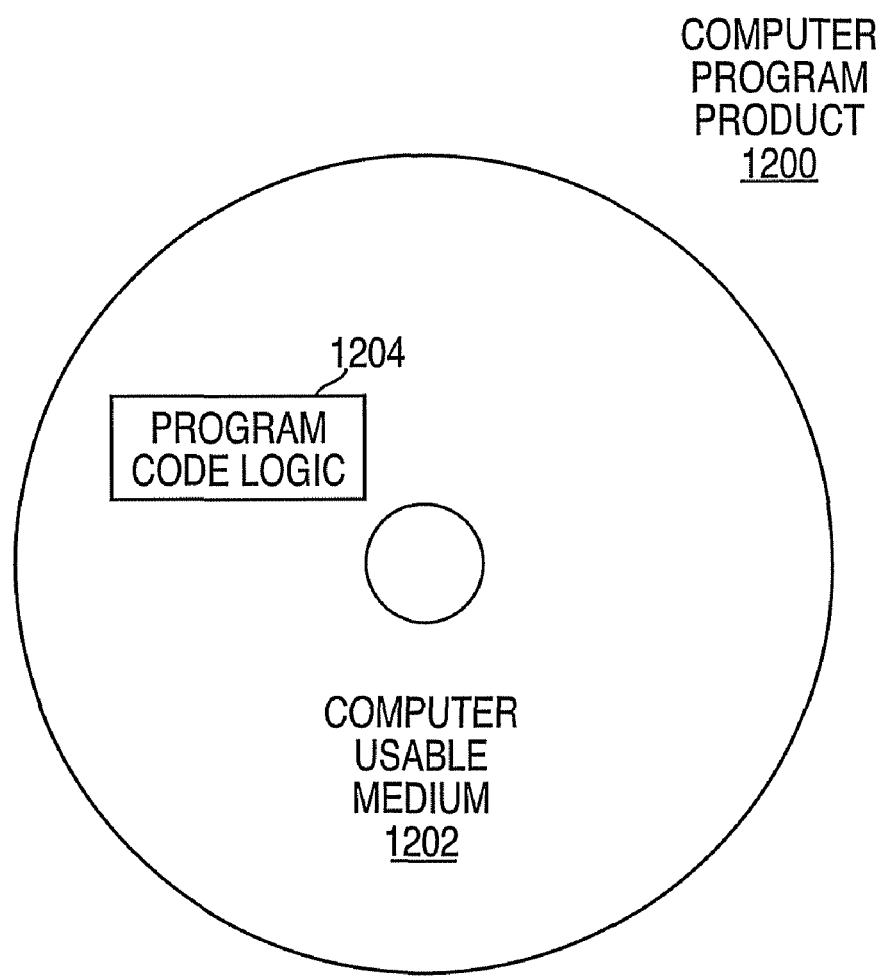
FIG. 12 depicts one embodiment of an article of manufacture incorporating one or more aspects of the present invention.

The capabilities of the present invention can be implemented in software, firmware, hardware or some combination thereof As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. An example includes computer program product 1200 as depicted in FIG. 12 on a computer usable medium 1202 with computer program code logic 1204 containing instructions embodied in tangible media as an article of manufacture. There may be multiple computer program products 1200, with each directed to implement functional processes on separate processing circuitry. For example, the processes 1000 and 1100 of FIGS. 10 and 11 can be embodied as computer program code logic 1204 on separate computer program products 1200, with one executable on the host system 101 of FIG. 1 and the other executable at one or more control units 110 of FIG. 1. Alternatively, the processes 1000 and 1100 can be stored as computer executable code on a single computer program product 1200.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The computer program code logic 1204 of FIG. 12 represents an embodiment of program code. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for processing a chain linked transport control channel program at a control unit configured for communication with an input/output (I/O) subsystem in an I/O processing system, the computer program product comprising:
  a tangible storage medium readable by a processing circuit and storing instructions for execution by the processing circuit for performing a method comprising:
    receiving a first command message at the control unit from the I/O subsystem, the first command message including a first set of one or more I/O commands to be performed and specifying a first predetermined sequence number for performing the first set of one or more commands as part of an I/O operation;
    receiving a second command message at the control unit from the I/O subsystem, the second command message including a second set of one or more I/O commands to be performed and specifying a second predetermined sequence number for performing the second set of one or more commands as part of the I/O operation;
    comparing the sequence numbers of the command messages received to a next expected predetermined sequence number to determine an order of performing the first set of one or more commands received relative to the second set of one or more commands received as a first execution set and a second execution set without regard to the order received; and
    executing the first and second execution sets in the determined order to perform the I/O operation.

2. The computer program product of claim 1 wherein the method further comprises:
  reading a chain linked flag in the first command message to determine whether a subsequent command message is expected to follow the first command message as part of the I/O operation;
  in response to determining that the subsequent command message is expected, and upon executing the first set of one or more commands received:
    continuing to run counters associated with the I/O operation to span multiple command messages; and
    transmitting a transport response message without extended status.

3. The computer program product of claim 2 wherein the method further comprises:
  receiving the subsequent command message including a subsequent set of one or more commands;
  examining command chain flags associated with each command in the subsequent set of one or more commands received to locate a final chain linked command; and
  transmitting a response message with extended status for the I/O operation in response to locating and executing the final chain linked command.

4. The computer program product of claim 1 wherein the method further comprises:
  executing a read command;
  determining that a record of data associated with the read command is smaller than a data count value;
  checking a pad flag associated with the read command; and
  inserting pad data in a data message in response to assertion of the pad flag, wherein the pad data is inserted up to the data count value.

5. The computer program product of claim 1 wherein the method further comprises:
  comparing a record length relative to a data count value;
  checking a suppress incorrect length flag; and
  suppressing identification of an incorrect length condition in response to assertion of the suppress incorrect length flag when the record length does not match the data count value.

6. The computer program product of claim 1 wherein the method further comprises:
  determining that one or more commands associated with a communication exchange cannot execute;
  sending a termination status message to the I/O subsystem indicating an inability to execute; and
  closing open communication exchanges with sequence numbers greater than a sequence number associated with the one or more non-executable commands.

7. The computer program product of claim 1 wherein the method further comprises:
  receiving a login request message; and
  transmitting a login accept message in response to the login request message, the login accept message including a maximum linked commands field indicating a maximum count of additional command messages queued after the first command message that the control unit supports.

8. The computer program product of claim 1 wherein the I/O subsystem is a channel subsystem and the first and second command messages are transport command information units comprising transport command control blocks (TCCBs) with the one or more commands in device control words (DCWs).

9. An apparatus for processing a chain linked transport control channel program at a control unit in an I/O processing system, the apparatus comprising:
  a control unit configured for communication with an I/O subsystem of the I/O processing system, the control unit performing a method comprising:
    receiving a first command message at the control unit from the I/O subsystem, the first command message including a first set of one or more I/O commands to be performed and specifying a first predetermined sequence number for performing the first set of one or more commands as part of an I/O operation;
    receiving a second command message at the control unit from the I/O subsystem, the second command message including a second set of one or more I/O commands to be performed and specifying a second predetermined sequence number for performing the second set of one or more commands as part of the I/O operation;
    comparing the sequence numbers of the command messages received to a next expected predetermined sequence number to determine an order of performing the first set of one or more commands received relative to the second set of one or more commands received as a first execution set and a second execution set without regard to the order received; and
    executing the first and second execution sets in the determined order to perform the I/O operation.

10. The apparatus of claim 9 wherein the method further comprises:
  reading a chain linked flag in the first command message to determine whether a subsequent command message is expected to follow the first command message as part of the I/O operation;

in response to determining that the subsequent command message is expected, and upon executing the first set of one or more commands received:
   continuing to run counters associated with the I/O operation to span multiple command messages; and
   transmitting a transport response message without extended status.

11. The apparatus of claim 10 wherein the method further comprises:
   receiving the subsequent command message including a subsequent set of one or more commands;
   examining command chain flags associated with each command in the subsequent set of one or more commands received to locate a final chain linked command; and
   transmitting a response message with extended status for the I/O operation in response to locating and executing the final chain linked command.

12. The apparatus of claim 9 wherein the method further comprises:
   executing a read command;
   determining that a record of data associated with the read command is smaller than a data count value;
   checking a pad flag associated with the read command; and
   inserting pad data in a data message in response to assertion of the pad flag, wherein the pad data is inserted up to the data count value.

13. The apparatus of claim 9 wherein the method further comprises:
   comparing a record length relative to a data count value;
   checking a suppress incorrect length flag; and
   suppressing identification of an incorrect length condition in response to assertion of the suppress incorrect length flag when the record length does not match the data count value.

14. The apparatus of claim 9 wherein the method further comprises:
   determining that one or more commands associated with a communication exchange cannot execute;
   sending a termination status message to the I/O subsystem indicating an inability to execute; and
   closing open communication exchanges with sequence numbers greater than a sequence number associated with the one or more non-executable commands.

15. The apparatus of claim 9 wherein the method further comprises:
   receiving a login request message; and
   transmitting a login accept message in response to the login request message, the login accept message including a maximum linked commands field indicating a maximum count of additional command messages queued after the first command message that the control unit supports.

16. The apparatus of claim 9 wherein the I/O subsystem is a channel subsystem and the first and second command messages are transport command information units comprising transport command control blocks (TCCBs) with the one or more commands in device control words (DCWs).

17. A method for processing a chain linked transport control channel program at a control unit configured for communication with an input/output (I/O) subsystem in an I/O processing system, the method comprising:
   receiving a first command message at the control unit from the I/O subsystem, the first command message including a first set of one or more I/O commands to be performed and specifying a first predetermined sequence number for performing the first set of one or more commands as part of an I/O operation;
   receiving a second command message at the control unit from the I/O subsystem, the second command message including a second set of one or more I/O commands to be performed and specifying a second predetermined sequence number for performing the second set of one or more commands as part of the I/O operation;
   comparing the sequence numbers of the command messages received to a next expected predetermined sequence number to determine an order of performing the first set of one or more commands received relative to the second set of one or more commands received as a first execution set and a second execution set without regard to the order received; and
   executing the first and second execution sets in the determined order to perform the I/O operation.

18. The method of claim 17 further comprising:
   reading a chain linked flag in the first command message to determine whether a subsequent command message is expected to follow the first command message as part of the I/O operation;
   in response to determining that the subsequent command message is expected, and upon executing the first set of one or more commands received:
      continuing to run counters associated with the I/O operation to span multiple command messages; and
      transmitting a transport response message without extended status.

19. The method of claim 18 further comprising:
   receiving the subsequent command message including a subsequent set of one or more commands;
   examining command chain flags associated with each command in the subsequent set of one or more commands received to locate a final chain linked command; and
   transmitting a response message with extended status for the I/O operation in response to locating and executing the final chain linked command.

20. A computer program product for processing a chain linked transport control channel program at a channel subsystem configured for communication with a control unit in an input/output (I/O) processing system, computer program comprising:
   a tangible storage medium readable by a processing circuit and storing instructions for execution by the processing circuit for performing a method comprising:
      configuring a first command message specifying a first predetermined sequence number for performing a first set of one or more commands as part of an I/O operation;
      configuring a second command message specifying a second predetermined sequence number for performing a second set of one or more commands as part of the I/O operation;
      establishing a chain link between the first and second command messages, the predetermined sequence numbers providing an order of performing the first set of one or more commands relative to the second set of one or more commands without regard to the order received at the control unit;
      setting a chain linked flag in the first command message to notify the control unit to expect a subsequent command message to follow the first command message as part of the I/O operation;

setting a command chain flag associated with a command in a subsequent set of one or more commands to identify a final chain linked command, the subsequent set of one or more commands including the second set of one or more commands or an additional set of one or more commands in an additional command message;

transmitting the first command message and at least one of the second command message and the additional command message from the channel subsystem to the control unit;

receiving a transport response message without extended status in response to transmitting the first command message; and receiving a transport response message with extended status in response to transmitting the subsequent set of one or more commands including the final chain linked command.

21. The computer program product of claim 20 wherein the method further comprises:

generating a program control interrupt (PCI) as an intermediate status interrupt in response to receiving the transport response message without extended status; and outputting the PCI to an operating system of the I/O processing system.

22. The computer program product of claim 20 wherein the method further comprises:

setting a pad flag associated with one or more of the commands transmitted to the control unit requesting that pad data is inserted up to a data count value; and setting a suppress incorrect length flag to request suppressing identification of an incorrect length condition in response to assertion of the suppress incorrect length flag when a record length on a read or write operation at the control unit does not match the data count value.

23. A computer program product for processing a chain linked transport control channel program at a channel subsystem configured for communication with a control unit in an input/output (I/O) processing system, the computer program product comprising:

a tangible storage medium readable by a processing circuit and storing instructions for execution by the processing circuit for performing a method comprising:

configuring a first command message specifying a first predetermined sequence number for performing a first set of one or more commands as part of an I/O operation;

configuring a second command message specifying a second predetermined sequence number for performing a second set of one or more commands as part of the I/O operation;

establishing a chain link between the first and second command messages, the predetermined sequence numbers providing an order of performing the first set of one or more commands relative to the second set of one or more commands without regard to the order received at the control unit;

transmitting a login request message including a channel maximum linked commands field indicating a maximum count of additional command messages queued after the first command message that the channel subsystem supports;

receiving a login accept message in response to the login request message, the login accept message including a control unit maximum linked commands field indicating a maximum count of additional command messages queued after the first command message that the control unit supports;

transmitting the first and second command messages from the channel subsystem to the control unit; and limiting transmission of command messages to the control unit to comply with the control unit maximum linked commands field.

* * * * *